(12) United States Patent
Hwang et al.

(10) Patent No.: US 12,322,372 B2
(45) Date of Patent: Jun. 3, 2025

(54) ACOUSTIC LUNEBURG META LENS AND DESIGN METHOD THEREOF

(71) Applicants: ELECTRONICS AND TELECOMMUNICATIONS RESEARCH INSTITUTE, Daejeon (KR); MOKPO NATIONAL MARITIME UNIVERSITY INDUSTRY-ACADEMIC COOPERATION FOUNDATION, Mokpo-si (KR)

(72) Inventors: Gunn Hwang, Daejeon (KR); Sang-Hoon Kim, Mokpo-si (KR); Jung-Woo Kim, Pyeongtaek-si (KR)

(73) Assignees: Electronics and Telecommunications Research Institute, Daejeon (KR); Mokpo National Maritime University Industry-Academic Cooperation Foundation, Mokpo-si (KR)

( * ) Notice: Subject to any disclaimer, the term of this patent is extended or adjusted under 35 U.S.C. 154(b) by 814 days.

(21) Appl. No.: 17/561,539

(22) Filed: Dec. 23, 2021

(65) Prior Publication Data

US 2022/0342118 A1    Oct. 27, 2022

(30) Foreign Application Priority Data

Apr. 22, 2021   (KR) .......................... 10-2021-0052341

(51) Int. Cl.
*G10K 11/30*   (2006.01)
*G02F 1/33*    (2006.01)
(Continued)

(52) U.S. Cl.
CPC .............. *G10K 11/30* (2013.01); *G02B 1/002* (2013.01); *G10K 2200/10* (2013.01)

(58) Field of Classification Search
CPC ........ G10K 11/30; G10K 11/26; G10K 11/18; G10K 2200/10; G10K 2200/00; H04R 1/32; G02F 1/335; G02F 1/33; G02F 1/11
See application file for complete search history.

(56) References Cited

U.S. PATENT DOCUMENTS 7,173,767 B2 *   2/2007   Satzke ................. G02B 3/0087
                                                        359/652
8,833,510 B2 *   9/2014   Koh ........................ F16F 15/02
                                                         181/207
(Continued)

FOREIGN PATENT DOCUMENTS

CN       115061122 A   *   9/2022
KR    10-2020-0067074 A       6/2020
(Continued)

OTHER PUBLICATIONS

Yangbo Xie et al., "Acoustic Imaging with Metamaterial Luneburg Lenses", Nature Scientific Reports, pp. 1-6, Nov. 1, 2018.
(Continued)

*Primary Examiner* — Edgardo San Martin
(74) *Attorney, Agent, or Firm* — Rabin & Berdo, P.C.

(57) ABSTRACT

Provided are an acoustic Luneburg meta lens including a lens structure on the substrate or a lens structure connected to each other by connecting rods, wherein the lens structure includes a plurality of unit structures, the volume of the unit structures decreases from the center of the lens structure toward an edge thereof, and positions of the unit structures are determined by direction components of a polar coordinate system or a spherical coordinate system, and a method for designing the acoustic Luneburg meta lens.

14 Claims, 28 Drawing Sheets

(51) Int. Cl.
*G10K 11/18* (2006.01)
*H04R 1/32* (2006.01)
*G02B 1/00* (2006.01)

(56) References Cited

U.S. PATENT DOCUMENTS

| | | | |
|---|---|---|---|
| 9,581,796 B2 * | 2/2017 | Leonhardt | G02B 17/086 |
| 10,777,902 B2 | 9/2020 | Kawahata | |
| 10,783,871 B2 * | 9/2020 | Norris | G10K 11/30 |
| 11,747,524 B2 * | 9/2023 | Park | G02B 5/1814 |
| | | | 359/652 |
| 12,072,511 B2 * | 8/2024 | Park | G02B 1/002 |
| 2011/0199273 A1 | 8/2011 | Kim et al. | |
| 2012/0327516 A1 | 12/2012 | Abbaspour-Tamijani | |
| 2013/0321902 A1 | 12/2013 | Choi | |
| 2017/0299752 A1 | 10/2017 | Swett | |
| 2018/0259643 A1 * | 9/2018 | Kim | G01S 15/06 |
| 2019/0154877 A1 | 5/2019 | Capasso et al. | |
| 2019/0324347 A1 * | 10/2019 | Cummer | G02B 6/12004 |
| 2021/0056948 A1 * | 2/2021 | Liang | G10K 11/30 |
| 2022/0211345 A1 * | 7/2022 | Osawa | B06B 1/067 |

FOREIGN PATENT DOCUMENTS

| | | | | |
|---|---|---|---|---|
| KR | 20210127857 A | * | 10/2021 | |
| KR | 20220073406 A | * | 6/2022 | |
| KR | 20220110377 A | * | 8/2022 | |
| KR | 20230127444 A | * | 9/2023 | |
| WO | WO-2020209889 A1 | * | 10/2020 | H01Q 15/08 |
| WO | WO-2021112427 A1 | * | 6/2021 | |
| WO | WO-2021226669 A1 | * | 11/2021 | |

OTHER PUBLICATIONS

Jung-Woo Kim et al., "Acoustic imaging by three-dimensional acoustic Luneburg meta-lens with lattice columns", : Appl. Phys. Lett. 118, Sep. 19, 2002 (2021); Submitted: Nov. 14, 2020 • Accepted: Feb. 17, 2021 • Published Online: Mar. 2, 2021.

* cited by examiner

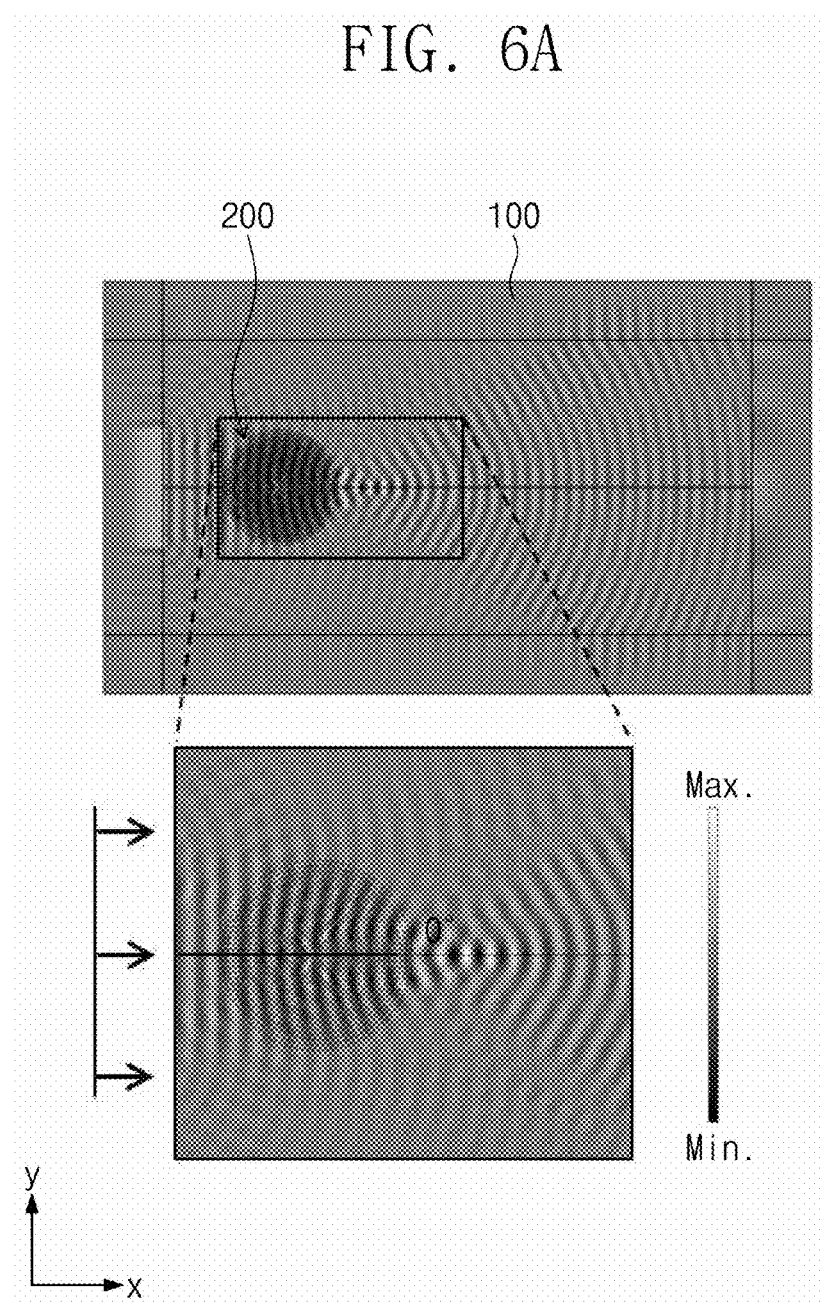

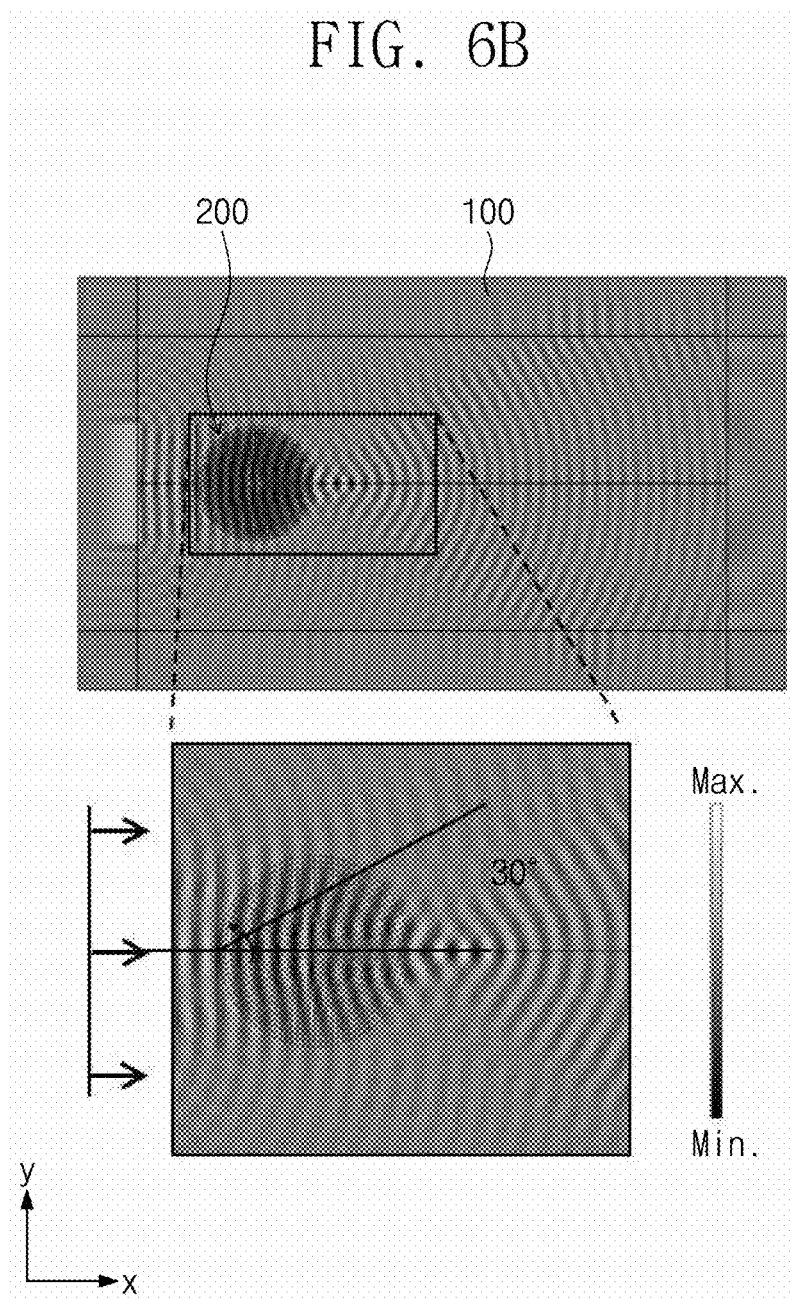

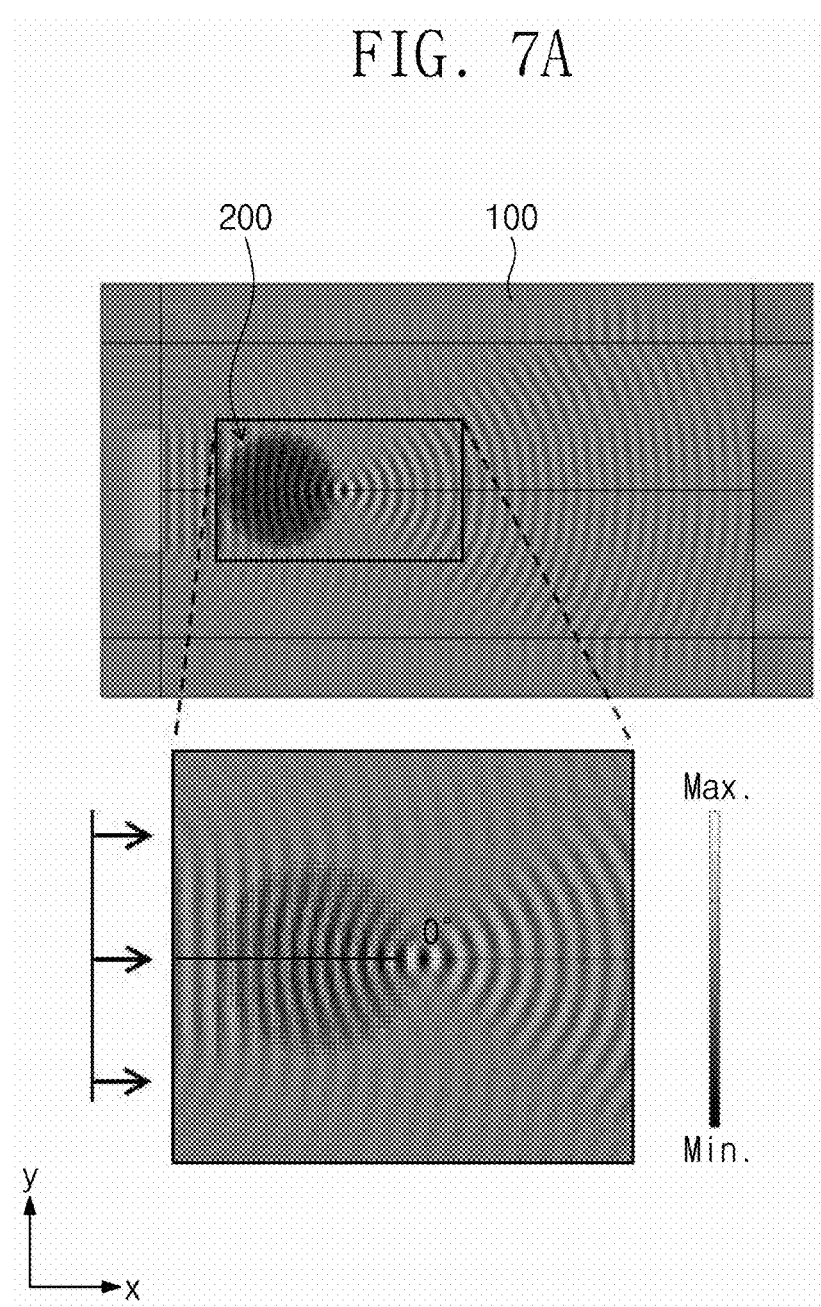

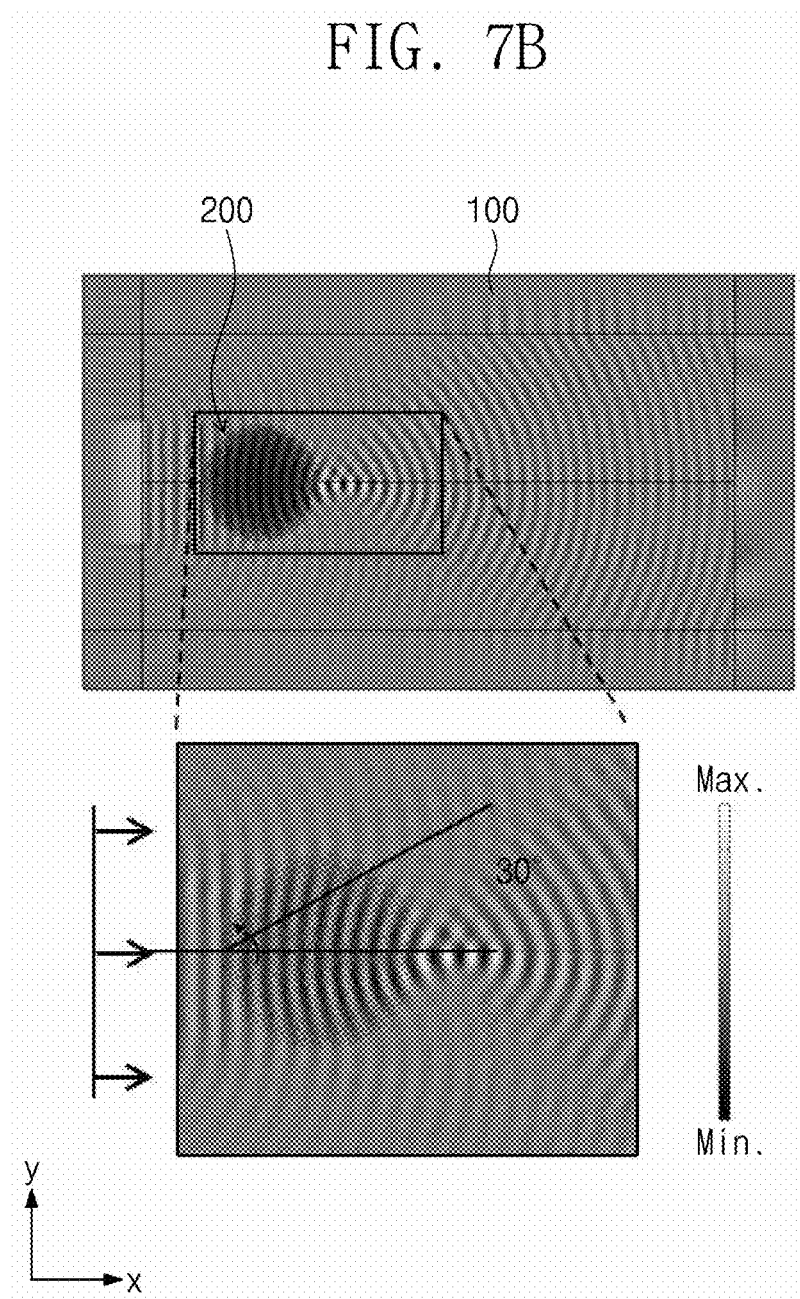

ACOUSTIC LUNEBURG META LENS AND DESIGN METHOD THEREOF

CROSS-REFERENCE TO RELATED APPLICATIONS

This U.S. non-provisional patent application claims priority under 35 U.S.C. § 119 of Korean Patent Application No. 10-2021-0052341, filed on Apr. 22, 2021, the entire contents of which are hereby incorporated by reference.

BACKGROUND

The present disclosure herein relates to an acoustic Luneburg meta lens and a design method thereof, and more particularly, to a method for designing an acoustic Luneburg meta lens using a polar coordinate system or a spherical coordinate system, and an acoustic Luneburg meta lens designed according to the method.

A refractive index converting type lens means a lens having no aberration due to a refractive index gradient of a material as part of conversion optics, wherein a refractive index of the material is a dimensionless number representing a rate at which light passes through the material. In 1964, R. K. Luneburg proposed a Luneburg lens which focuses incident parallel light on one point on the opposite side of a lens incident region. The Luneburg lens may have a spherical, axial, or radial refractive index gradient, and is a representative refractive index converting type lens having no aberration since the refractive index thereof is gradually changed.

A meta material is derived from a Greek word μετά and a Latin word materia, wherein 'meta' means 'transcendence' and 'materia' means a 'material.' That is, a meta material is a material designed to have properties not found in a naturally generated material. The nature of such a meta material is expressed by "structural properties" by a periodic arrangement, not by the properties of a constituent material. A structure constituting a meta material has the size of a sub-wavelength which is less than the length of a wavelength with which an object interacts, and is repeatedly disposed at a predetermined period. Therefore, a metal material is widely used due to its advantages in that an operation wave may be selected and the performance of existing materials or devices may be increased.

Accordingly, research has been conducted to implement an acoustic Luneburg lens with a meta material. Particularly, there is a demand for need for an acoustic Luneburg meta lens which may implement the same properties regardless of the incident angle of a wave incident on the lens.

SUMMARY

The present invention provides an acoustic Luneburg meta lens which has omnidirectional properties and which may be effectively designed in a short period of time using symmetry.

Problems to be solved by the present invention are not limited to the problems mentioned above, and other problems that are not mentioned above will be clearly understood by those skilled in the art from the following disclosure.

An embodiment of the inventive concept provides an acoustic Luneburg meta lens including a lens structure, wherein the lens structure includes a plurality of unit structures, a volume of the unit structures decreases from a center of the lens structure toward an edge thereof, and positions of the unit structures are determined by a radial direction component and a tangential direction component of a polar coordinate system.

In an embodiment, the acoustic Luneburg meta lens may further include a substrate under the lens structure.

In an embodiment, the acoustic Luneburg meta lens may further include a reflection plate on the substrate, wherein the lens structure may have a semi-circular shape, and one surface of the lens structure may be in contact with the reflection plate.

In an embodiment, the acoustic Luneburg meta lens may further include connecting rods connecting the unit structures to each other.

In an embodiment, a refractive index of the lens structure may be changed according to a following [Equation 1].

$$n=\sqrt{2-(r/R)^2} \quad \text{[Equation 1]}$$

At this time, n represents a refractive index, r represents a distance from the center of the lens structure, and R represents a radius of the lens structure.

In an embodiment, an upper surface of each of the unit structures may have a circular shape, polygonal shape, or a sector shape with a truncated central portion.

In an embodiment, areas of the upper surfaces of the unit structures may decrease as a distance from the center of the lens structure increases.

In an embodiment, a diameter of the lens structure in a first direction may be less than a diameter thereof in a second direction orthogonal to the first direction.

In an embodiment, the diameter of the lens structure in the first direction may be $1/n$ times (n is a natural number) the diameter thereof in the second direction.

In an embodiment, the unit structures may include a material having a greater impedance than a background material.

In an embodiment, an upper limit of an operation frequency domain may be inversely proportional to a pitch at which the unit structures are arranged in a radial direction, and a lower limit of the operation frequency domain may be inversely proportional to a diameter of the lens structure.

In an embodiment, a thickness of the lens structure may be smaller than a wavelength of an operation wave.

In an embodiment of the inventive concept, an acoustic Luneburg meta lens includes a plurality of unit structures forming a three-dimensional spherical shape and arranged in radial, tangential and azimuthal directions, and supporting parts connecting the unit structures to each other, wherein a volume of the unit structures may decrease from a center of the three-dimensional spherical shape toward an edge thereof, and positions of the unit structures may be determined by a radial direction component, a tangential direction component, and an azimuthal direction component.

In an embodiment, a cross-section of each of the unit structures has a sector shape with a truncated central portion.

In an embodiment of the inventive concept, a method for designing an acoustic Luneburg meta lens includes designing unit cells, and respectively disposing a unit structure in each of the unit cells, wherein a volume of the unit structures may decrease from a center toward an edge, and positions of the unit cells and the unit structures may be determined by direction components of a polar coordinate system or a spherical coordinate system.

In an embodiment, the designing of unit cells may include designing a plurality of unit cell rows, and dividing each of the unit cell rows into the unit cells of the same volume, wherein each of the unit cell rows may have a concentric ring shape, and an upper surface of each of the unit cells may have a sector shape with a truncated central portion.

In an embodiment, radii of the unit cell rows may increase at regular intervals as a distance from the center increases, and a radius of each of the unit structures may be less than or equal to the interval of the unit cell rows.

In an embodiment, an upper surface of each of the unit structures may have a shape in which an upper surface of each of the unit cells is reduced to a predetermined ratio, and the upper surface of each of the unit structures may be similar to the upper surface of each of the unit cells.

In an embodiment, an upper surface of each of the unit structures may have a shape of a circle, ellipse, polygon, or cross.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 6A and FIG. 6B are conceptual views showing computational simulation results of a sound wave incident on an acoustic Luneburg meta lens according to embodiments of the inventive concept;

FIG. 7A and FIG. 7B are conceptual views showing computational simulation results of a sound wave incident on an acoustic Luneburg meta lens according to comparative embodiments;

DETAILED DESCRIPTION

Figure 1:
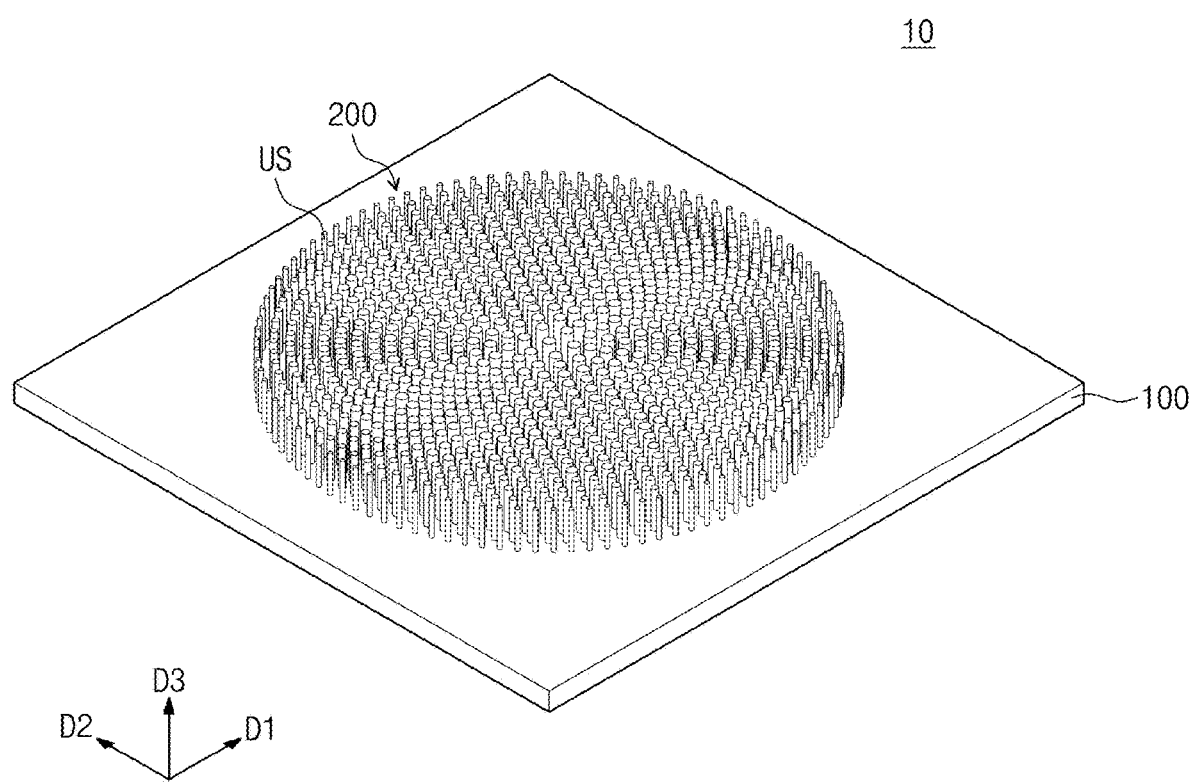
FIG. 1 is a perspective view for describing an acoustic Luneburg meta lens according to embodiments of the inventive concept.

In order to facilitate sufficient understanding of the configuration and effects of the present invention, preferred embodiments of the present invention will be described with reference to the accompanying drawings.

The present invention is not limited to the embodiments set forth below and may be embodied in various forms and modified and changed in many alternate forms. Rather, the present embodiments are provided so that this disclosure will be thorough and complete, and will fully convey the scope of the present invention to those skilled in the art to which the present invention pertains. In the accompanying drawings, elements are illustrated enlarged from the actual size thereof for convenience of description, and the ratio of each element may be exaggerated or reduced.

The terms used herein are for the purpose of describing the embodiments and are not intended to be limiting of the present invention. Unless otherwise defined, terms used herein may be interpreted as having meanings commonly known to those skilled in the art.

In the present specification, singular forms include plural forms unless the context clearly indicates otherwise. As used herein, the terms "comprises" and/or "comprising" are intended to be inclusive of the stated elements, steps, operations and/or devices, and do not exclude the possibility of the presence or the addition of one or more other elements, steps, operations, and/or devices.

In the present specification, when a layer is referred to as being on another layer, it may mean that the layer is directly formed on the another layer or that a third layer is interposed therebetween.

Although the terms first, second, and the like are used in the present specification to describe various regions, layers, and the like, these regions, layer, and the like should not be limited by these terms. These terms are only used to distinguish any predetermined region or layer from another region or layer. Thus, a portion referred to as a first portion in one embodiment may be referred to as a second portion in another embodiment. The embodiment described and exemplified herein also includes a complementary embodiment thereof. Like reference numerals refer to like elements throughout the specification.

Hereinafter, an acoustic Luneburg meta lens according to embodiments of the inventive concept will be described in detail with reference to the accompanying drawings.

FIG. 1 is a perspective view for describing an acoustic Luneburg meta lens according to embodiments of the inventive concept.

Referring to FIG. 1, an acoustic Luneburg meta lens 10 according to the present invention may include a substrate 100 and a lens structure 200 on the substrate 100. The substrate 100 is parallel to a first direction D1 and a second direction D2, and may have an upper surface orthogonal to a third direction D3. In some embodiments, the substrate 100 may also be provided on a top surface or sidewalls of the lens structure 200 to surround the lens structure. In some other embodiments, the substrate 100 may not be provided.

The lens structure 200 may have, for example, a cylindrical shape. The thickness of the lens structure 200 in the third direction D3 may be smaller than the radius of the lens structure 200. For example, the thickness of the lens structure 200 in the third direction D3 may be smaller than a wavelength of an operation wave (that is, a wave to be focused and/or amplified).

The lens structure 200 may include a plurality of unit structures US, and the unit structures US may be arranged to have rotational symmetry with respect to the center of the lens structure 200. In addition, the unit structures US may be arranged to be linearly symmetric with respect to any straight axis passing through the center of the lens structure 200. In some embodiments in which the substrate 100 is not provided, the acoustic Luneburg meta lens 10 may further include connecting rods connecting the unit structures US to each other.

The volume of the unit structures 200 (i.e. volume ratio of the unit structures 200 to unit cells to be described later) may decrease from the center of the lens structure 200 toward an edge. The volume of the unit structures US may be the lowest at the edge of the lens structure 200 and the highest at the center of the lens structure 200.

Each of the unit structures US may have, for example, a column shape in which the area of an upper surface and the area of a lower surface are the same. The upper surface of each of the unit structures US may have, for example, a circular shape. The unit structures US may include a material having a greater impedance than a background material on which the Luneburg meta lens 10 is placed.

The Luneburg meta lens 10 is a meta-material implementation of a Luneburg lens, and the refractive index of a typical Luneburg lens is defined by a function of a radius (hereinafter, referred to as a refractive index function of the Luneburg lens) that depends only on the distance from the lens center, as shown in [Equation 1] below. At this time, n represents a refractive index, r represents a distance from the center of a lens, and R represents a radius of the lens.

$$n = \sqrt{2 - (r/R)^2}$$ [Equation 1]

The Luneburg lens has a refractive index of about 1.414(= $\sqrt{2}$) at the center, and has the same refractive index as a background medium at an edge. A wave incident on the center of the Luneburg lens becomes slower than when passing through the edge of the Luneburg lens, and a wave incident on the edge of the Luneburg lens is focused without aberration at one point of an opposite edge since the travel path of the wave is curved.

The volume of each of the unit structures US of the acoustic Luneburg meta lens 10 according to the present invention may be changed as the distance from the center of the lens structure 200 increases. For example, the volume of the unit structures US may decrease as the distance from the center of the lens structure 200 increases. However, the unit structures US having the same distance from the center of the lens structure 200 may have the same volume. When the volume of the unit structures US is changed, the density of the unit structures US to the unit cells UC is changed. According to the change in the density, the refractive index of the lens structure 200 may satisfy [Equation 1] above.

The acoustic Luneburg meta lens 10 according to the present invention may be designed through dividing a space in which the lens is to be provided into unit cells and disposing the unit structures US in each unit cells to satisfy the refractive index condition of [Equation 1] above. In order to divide the space in which a lens is to be provided into unit cells, a polar coordinate system (a spherical coordinate system in the case of a three-dimensional space) may be used. Hereinafter, with reference to the accompanying drawings, a method for designing the acoustic Luneburg meta lens 10 according to the present invention will be described in detail below.

Figure 2A:
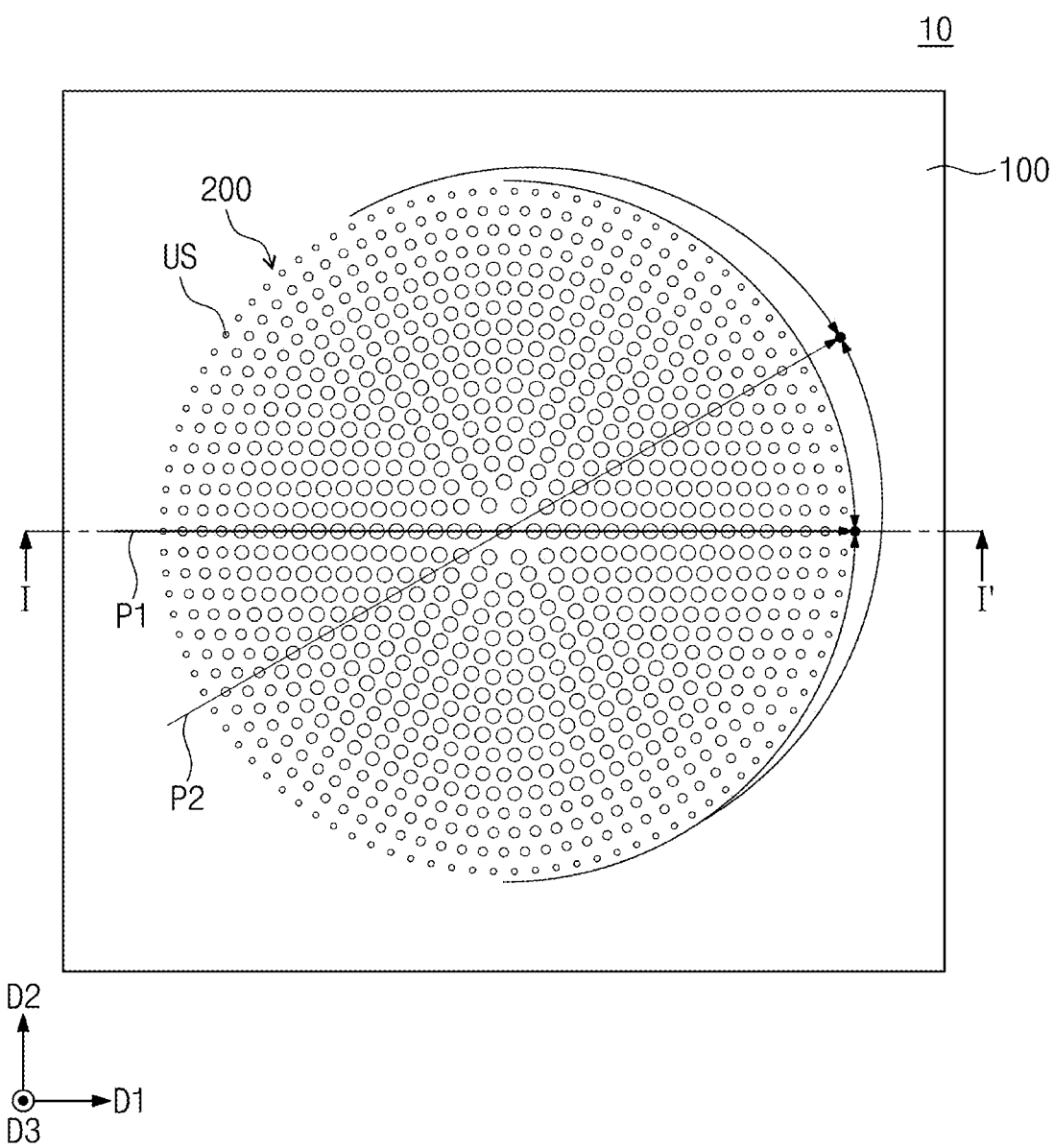
FIG. 2A is a plan view for describing an acoustic Luneburg meta lens according to embodiments of the inventive concept.
Figure 2B:
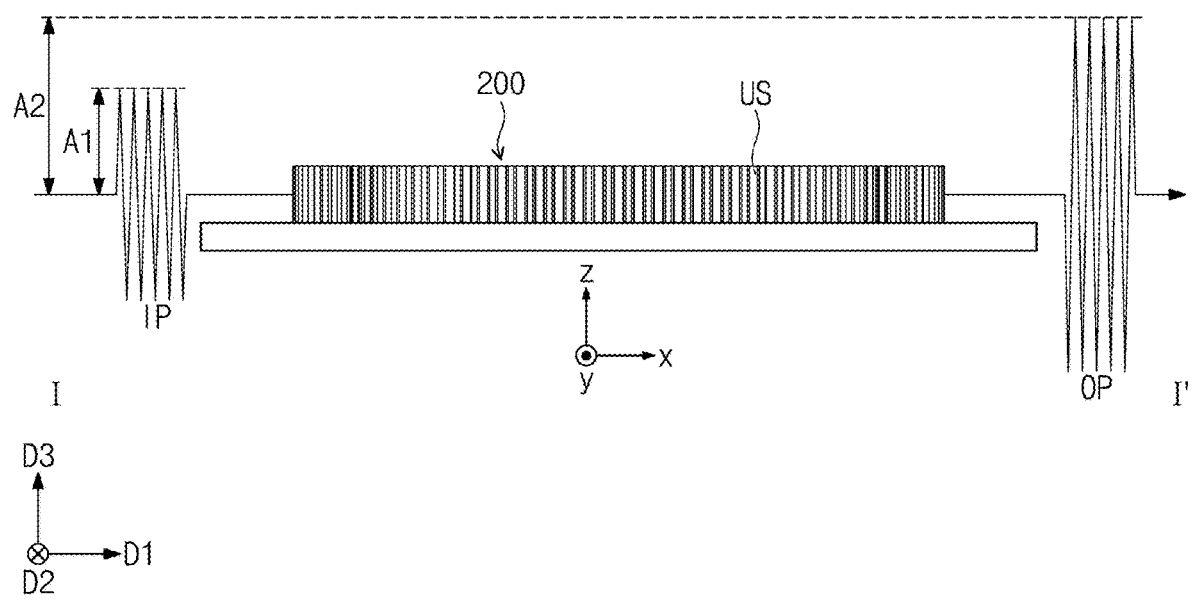
FIG. 2B is a cross-sectional view for describing an acoustic Luneburg meta lens according to embodiments of the inventive concept, and corresponds to a cross-section taken along line I-I' of FIG. 1.

FIG. 2A is a plan view for describing an acoustic Luneburg meta lens according to embodiments of the inventive concept. FIG. 2B is a cross-sectional view for describing an acoustic Luneburg meta lens according to embodiments of the inventive concept, and corresponds to a cross-section taken along line I-I' of FIG. 1.

Referring to FIG. 2A, the acoustic Luneburg meta lens 10 according to the present invention may focus incident waves P1 and P2 regardless of the direction of incidence. That is, the acoustic Luneburg meta lens 10 according to the present invention may exhibit substantially the same output properties (that is, omnidirectional properties) for the incident waves P1 and P2 having different directions of incidence. The output properties may be exhibited for a multi-source as well as a single source.

For example, a first incident wave P1 and a second incident wave P2 may be incident on the acoustic Luneburg meta lens 10 according to the present invention. For example, the first incident wave P1 may be incident in the first direction D1, and the second incident wave P2 may be incident in a direction forming a predetermined angle with respect to the first direction D1. Each of the first incident wave P1 and the second incident wave P2 may be focused without aberration at one point of an opposite edge of an incident point.

Referring to FIG. 2B, the acoustic Luneburg meta lens 10 according to the present invention may exhibit properties of focusing an incident wave at a focal point of the lens to amplify sound pressure. For example, the Luneburg meta lens 10 may amplify an incident pulse wave IP having a first amplitude A1 to output the same as a radiation pulse wave OP having a second amplitude A2.

The first and second incident waves P1 and P2 of FIG. 2A and the input/output pulse waves IP and OP of FIG. 2B may be, for example, waves proceeding in a plane parallel to the first direction D1 and the second direction D2 without a third direction D3 component.

Figure 3:
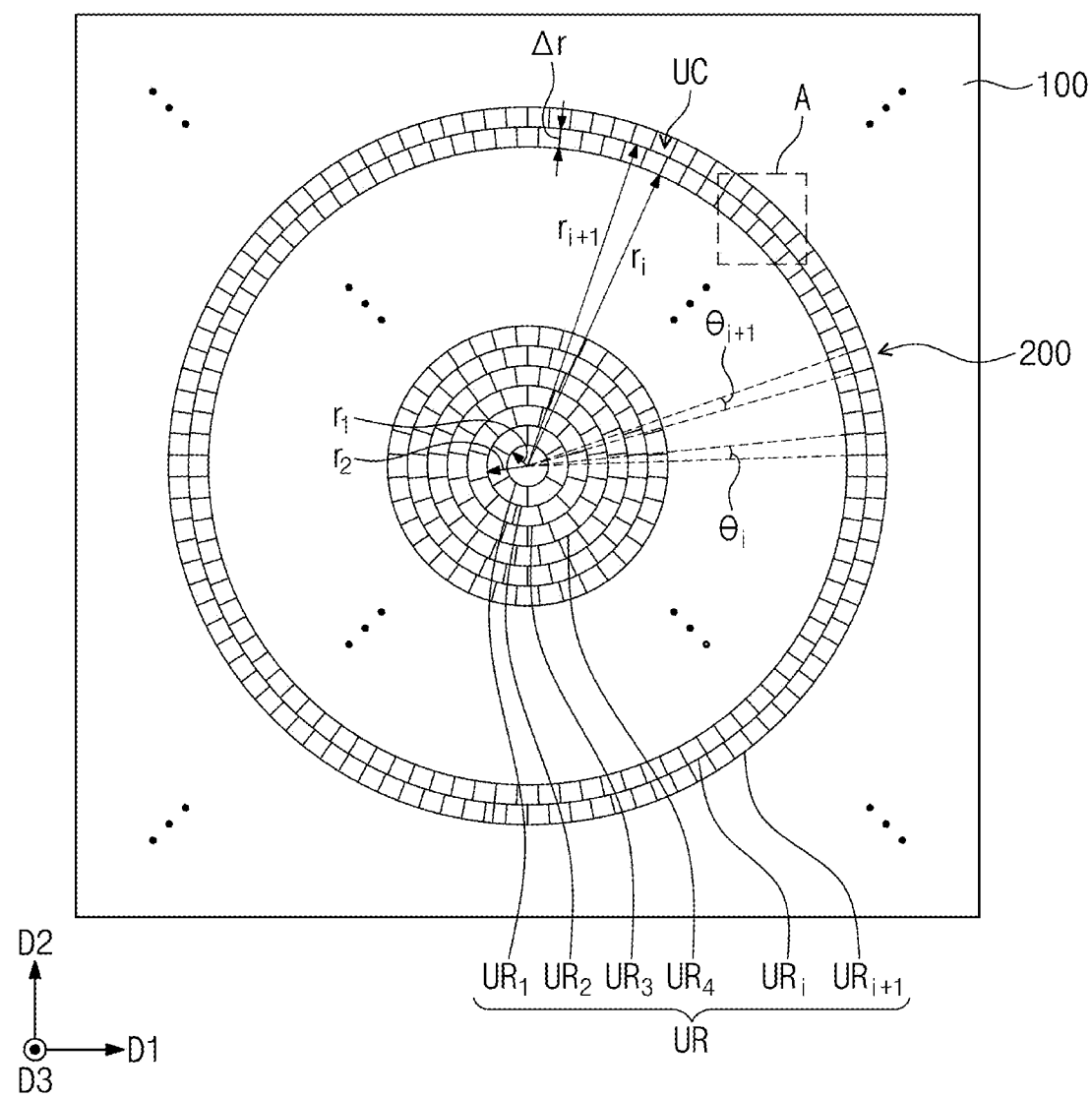
FIG. 3 is a plan view for describing a design method of an acoustic Luneburg meta lens according to embodiments of the inventive concept.
Figure 4A:
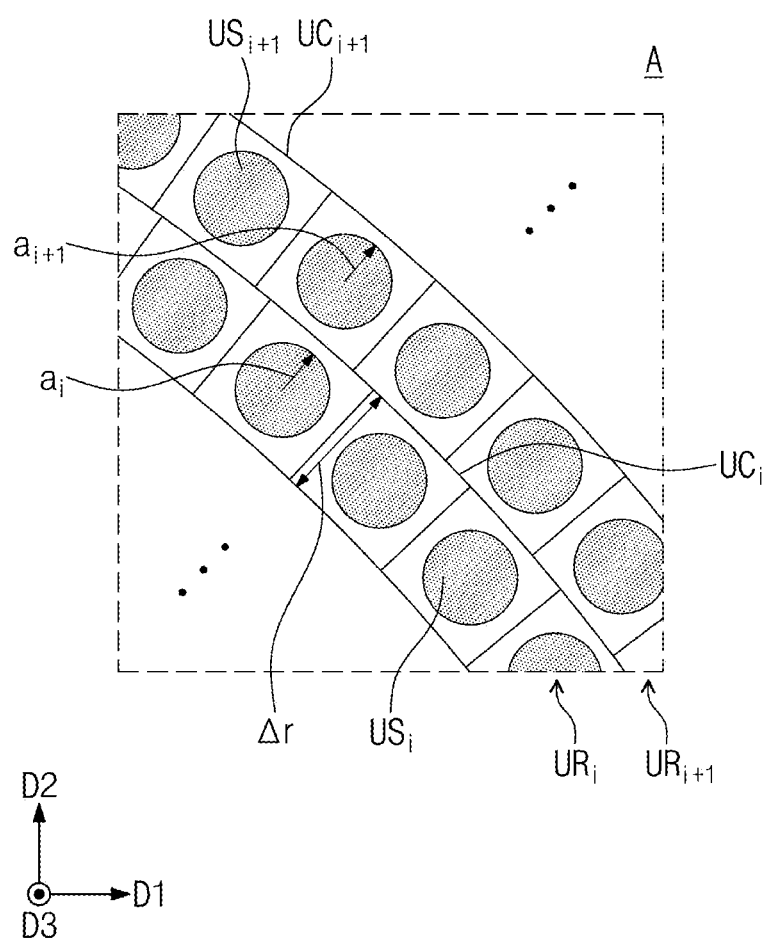
FIG. 4A and FIG. 5A are enlarged views for describing a design method of an acoustic Luneburg meta lens according to embodiments of the inventive concept, and each correspond to portion A of FIG. 3.
Figure 4B:
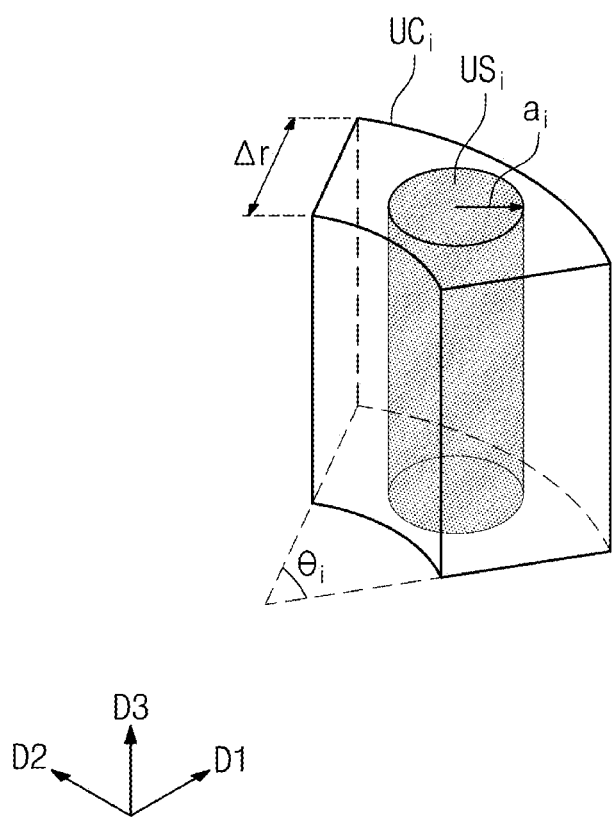
FIG. 4B and FIG. 5B are perspective views for describing a design method of a unit cell and a unit structure in the unit cell of an acoustic Luneburg meta lens according to embodiments of the inventive concept.

FIG. 3 is a plan view for describing a design method of an acoustic Luneburg meta lens according to embodiments of the inventive concept. FIG. 4A is an enlarged view for describing a design method of an acoustic Luneburg meta lens according to embodiments of the inventive concept, and corresponds to portion A of FIG. 3. FIG. 4B is a perspective view for describing a design method of a unit cell and a unit structure in the unit cell of an acoustic Luneburg meta lens according to embodiments of the inventive concept.

Referring to FIG. 3, FIG. 4A, and FIG. 4B, a method for designing the acoustic Luneburg meta lens 10 according to the present invention may include dividing a space in which the lens is to be provided into unit cells UC using a polar coordinate system represented by [Equation 2] below, and disposing the unit structures US in each unit cells UC to satisfy the refractive index condition of [Equation 1] above. At this time, x represents a distance from the center of the lens structure 200 in the first direction D1, y represents a distance from the center of the lens structure 200 in the second direction D2, r represents a distance from the center of the lens structure 200 in a radial direction, and θ represents an angle formed with respect to the first direction D1. Positions of the unit structures US of the Luneburg meta lens 10 may be determined by a radial direction component r and a tangential direction component θ of the polar coordinate system.

$$x = r\cos(\theta),\ y = r\sin(\theta)$$
$$r = \sqrt{x^2 + y^2},\ \theta = \arctan\left(\frac{y}{x}\right)$$

The dividing of the space in which the lens is to be provided into the unit cells UC may include dividing the space in which the lens is to be provided into a plurality of unit cell rows UR and dividing each of the unit cell rows UR into the unit cells UC having the same volume.

The unit cell rows US may each have a concentric ring shape. Specifically, the unit cell rows UR may each have a ring shape centered on the center of a first unit cell row $UR_1$ (that is, the center of the lens structure 200). An i-th unit cell row $UR_i$ may be surrounded by an i+1-th unit cell row $UR_{i+1}$. For example, the first unit cell row $UR_1$ may be surrounded by a second unit cell row $UR_2$, and the second unit cell row $UR_2$ may be surrounded by a third unit cell row $UR_3$. Hereinafter, i is a natural number representing positions of the unit cell rows UR, the unit cells UC, or the unit structures US, and has a larger value as the distance from the center of the lens structure 200 increases.

Radii of the unit cell rows UR may increase at regular intervals as the distance from the center increases. A difference $\Delta r$ between a radius $r_i$ of the i-th unit cell row $UR_i$ and a radius $r_{i+1}$ of the i+1-th unit cell row $UR_{i+1}$ may be substantially the same as a difference $\Delta r$ between a radius $r_1$ of the first unit cell row $UR_1$ and a radius $r_2$ of the second unit cell row $UR_2$. That is, the radius $r_i$ of the i-th unit cell row $UR_i$ and the radius $r_{i+1}$ of the i+1-th unit cell row $UR_{i+1}$ may be represented by [Equation 3] below.

$$r_i = i\Delta r;\ r_{i+1} = (i+1)\Delta r \quad \text{[Equation 3]}$$

An upper limit of an operation frequency domain of the acoustic Luneburg meta lens 10 according to the present invention may be inversely proportional to the interval $\Delta r$ between the unit cell rows UR described above (i.e. a pitch at which the unit structures US are arranged in a radial direction). Meanwhile, a lower limit of the operation frequency domain of the acoustic Luneburg meta lens 10 according to the present invention may be inversely proportional to the diameter of the entire lens structure 200. That is, as the diameter of the entire lens structure 200 is greater and the interval $\Delta r$ between the unit cell rows UR is smaller, the operation frequency domain of the acoustic Luneburg meta lens 10 according to the present invention may be larger.

Each of the unit cell rows UR may include a plurality of unit cells UC divided into the same volume. An upper surface of each of the unit cells UC may have, for example, a sector shape with a truncated central portion. An area $A_i$ of an upper surface of each of i-th unit cells $UC_i$ included in the i-th unit cell row $UR_i$ may be represented by [Equation 4] below. At this time, $\theta_i$ represents an angle (that is, the center angle of a fan) formed when opposite edges of any one of the i-th unit cells $UC_i$ included in the i-th unit cell row $UR_i$ are extended to meet each other. $\theta_i$ may be expressed by 360/k, and k may be, for example, an integer (for example, 180, 90, 72, 60, 45, etc.) expressed by a product of prime factors of 360.

$$A_i = \begin{cases} \frac{1}{2}(r_{i+1}^2 - r_i^2)\theta_i = \frac{1}{2}(2i+1)\Delta r \Delta r \theta_i = (i+0.5)\Delta r^2 \theta_i,\ i \geq 2 \\ \frac{1}{2}r_1^2,\ i = 1 \end{cases} \quad \text{[Equation 4]}$$

The unit structures US may be disposed one by one in each of the unit cells UC. The unit structures US may be disposed at the center of each of the unit cells UC. The unit structures US may be spaced apart from each other in a radial direction and a tangential direction.

The unit structures US disposed in any one of the unit cell rows UR may have substantially the same volume. Each of the unit structures US may have, for example, a column shape in which the area of an upper surface and the area of a lower surface are the same, but this is only exemplary. The inventive concept is not limited thereto. As long as it satisfies a refractive index condition, the shape of the upper surface of each of the unit structures US is not limited. The upper surface of each of the unit structures US may have, for example, various shapes, such as a circle, an ellipse, a polygon, and a cross.

The volume of the unit structures US may decrease as the distance from center of the lens structure 200 increases. Through a change in the volume of the unit structures US, the density of the unit structures US to the unit cells UC may be controlled. A radius $a_{i+1}$ of each of i+1-th unit structures $US_{i+1}$ disposed in the i+1-th unit cell row $UR_{i+1}$ may be smaller than a radius $a_i$ of each of i-th unit structures $US_i$ disposed in the i-th unit cell row $UR_i$. Hereinafter, the radius of each of the unit structures US means the radius of the upper surface of each of the unit structures US. The radius of each of the unit structures US may be smaller than or equal to the half of the different $\Delta r$ between the radius $r_i$ of the i-th unit cell row $UR_i$ and the radius $r_{i+1}$ of the i+1-th unit cell row $UR_{i+1}$.

A refractive index $n_i$ of the i-th unit cell row $UR_i$ may be expressed by the square root of the ratio of the volume of a space with respect to the difference between the volume of the space and the volume of an obstacle disposed therein, as in [Equation 5] below. In other words, the refractive index of the Luneburg meta lens 10 may be determined by the density of the unit structures US to the unit cells UC. At this time, the volume of the space may be expressed by the area $A_i$ of the upper surface of each of the i-th unit cells $UC_i$ included in the i-th unit cell row $UR_i$, and the volume of the obstacle may be expressed by an area $S_i$ of an upper surface of each of the i-th unit structures $US_i$.

$$n_i = \begin{cases} \sqrt{\dfrac{A_i}{A_i - S_i}} = \sqrt{\dfrac{(i+0.5)\Delta r^2 \theta_i}{(i+0.5)\Delta r^2 \theta_i - \pi a_i^2}}, & i \geq 2 \\ \sqrt{2}, & i = 1 \end{cases} \quad \text{[Equation 5]}$$

As the distance r from the center of the lens structure 200 increases, a decreases, and $a_i$ decreases, and at the edge of the lens structure 200, the refractive index may be close to 1. In addition, a radius $a_1$ of a first unit structure $US_1$ is about $1/1.414(=1/\sqrt{2})$ times the radius $r_i$ of a first unit cell $UC_1$ of the first unit cell row $UR_1$, and at the center of the lens structure 200, the refractive index may be about $1.414(=\sqrt{2})$. As a result, the refractive index of the lens structure 200 may be changed according to the refractive index function of a typical Luneburg lens described with reference to [Equation 1].

By the above-described design method, the unit cells US and the unit structures US of the lens structure 200 may be arranged to have rotational symmetry with respect to the center of the lens structure 200. The design method of the Luneburg meta lens 10 using a polar coordinate system according to the present invention may reduce a design time compared to when using a rectangular coordinate system according to a comparative example, may design the lens structure 200 close to an accurate circular shape (or spherical shape), and may implement the lens structure 200 having complete omnidirectional properties. More specifically, when a rectangular coordinate system is used according to a comparative example, the output properties of the lens greatly vary according to an angle at which a wave is incident, but when a polar coordinate system is used according to the present invention, the same output properties may be exhibited regardless of an incident angle of a wave.

Figure 5A:
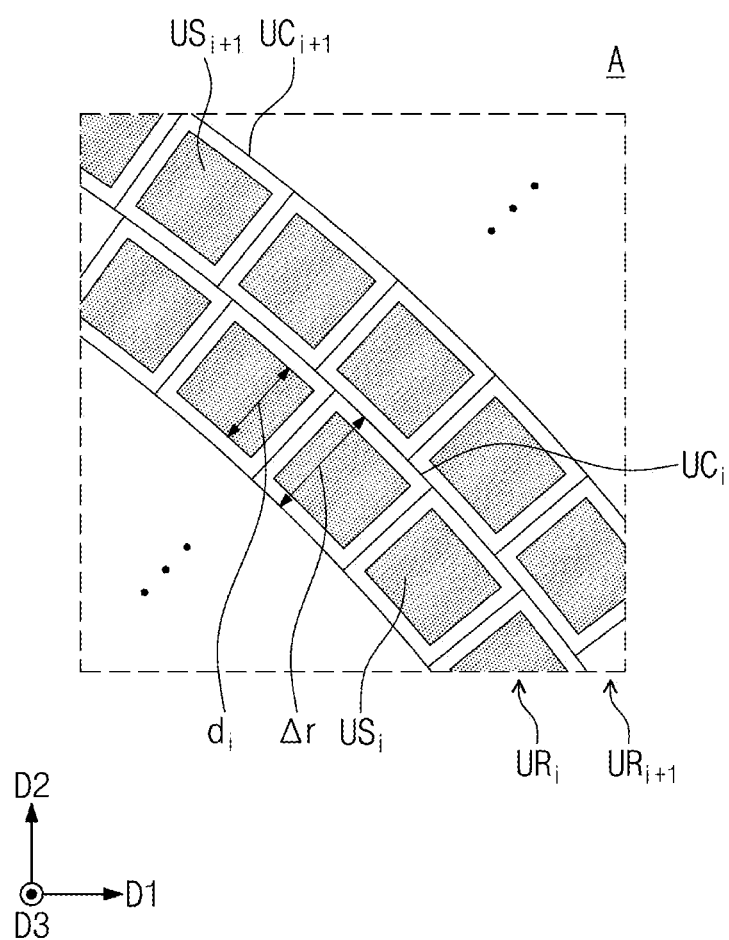
Figure 5B:
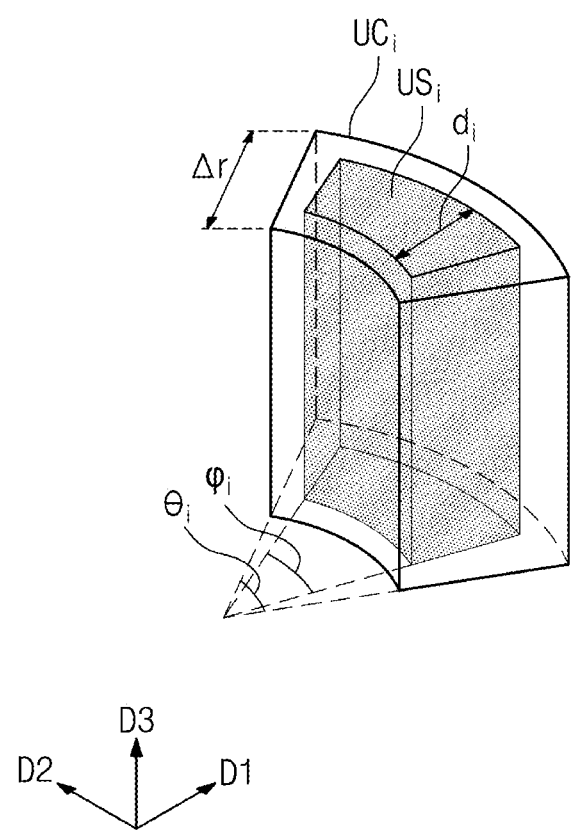

FIG. 5A is an enlarged view for describing a design method of an acoustic Luneburg meta lens according to embodiments of the inventive concept, and corresponds to portion A of FIG. 3. FIG. 5B is a perspective view for describing a design method of a unit cell and a unit structure in the unit cell of an acoustic Luneburg meta lens according to embodiments of the inventive concept. For convenience of description, descriptions of matters substantially the same as those described with reference to FIG. 3, FIG. 4A, and FIG. 4B will be omitted, and differences will be described in detail.

Referring to FIG. 3, FIG. 5A, and FIG. 5B, each of the unit structures US may have, for example, a column shape in which the area of an upper surface and the area of a lower surface are the same. The upper surface of each of the unit structures US may have, for example, a sector shape with a truncated central portion.

The refractive index $n_i$ of the i-th unit cell row $UR_i$ may be expressed by the square root of the ratio of the volume of a space with respect to the difference between the volume of the space and the volume of an obstacle disposed therein, as in [Equation 6] below. At this time, $\theta_i$ represents an angle (that is, the center angle of a fan) formed when opposite edges of any one of the i-th unit cells $UC_i$ included in the i-th unit cell row $UR_i$ are extended to meet each other, and $\varphi_i$ represents an angle (that is, the center angle of a fan) formed when opposite edges of any one of the i-th unit structures $US_i$ disposed in each of the i-th unit cells $UC_i$ are extended to meet each other. $\varphi_i$ may be smaller than $\theta_i$. In addition, $d_i$ represents the width of the upper surface of each of the i-th unit structures $US_i$ in a radial direction. $d_i$ may be smaller than $\Delta r$.

$$n_i = \begin{cases} \sqrt{\dfrac{A_i}{A_i - S_i}} = \sqrt{\dfrac{(i+0.5)\Delta r^2 \theta_i}{(i+0.5)\Delta r^2 \theta_i - (i+0.5)\Delta r d_i \phi_i}} = \sqrt{\dfrac{\Delta r \theta_i}{\Delta r \theta_i - d_i \phi_i}}, & i \geq 2 \\ \sqrt{2}, & i = 1 \end{cases} \quad \text{[Equation 6]}$$

Meanwhile, the upper surface of each of the unit structures US may have a shape in which the upper surface of each of the unit cells UC is reduced to a predetermined ratio. The upper surface of each of the unit structures US may be similar to the upper surface of each of the unit cells UC. The ratio may vary in each of the unit cell rows UR. The refractive index $n_i$ of the i-th unit cell row $UR_i$ may be expressed by [Equation 7] below. At this time, N represents the number of unit cell rows UR, and $X_i$ represents the ratio of the volume of an obstacle disposed in a space to the volume of the space in the i-th unit cell row $UR_i$.

$$n_i = \sqrt{2 - \left(\dfrac{i}{N}\right)^2} \quad \text{[Equation 7]}$$

$$= \begin{cases} \sqrt{\dfrac{\pi r_1^2}{\pi r_1^2 - \pi(r_1 \times x_1^2)}}, & i = 1 \\ \sqrt{\dfrac{\pi r_i^2 - \pi r_{i-1}^2}{(\pi r_i^2 - \pi r_{i-1}^2) - (\pi(r_i \times x_i)^2 - \pi(r_{i-1} \times x_{i-1})^2)}}, & i \geq 2 \end{cases}$$

As described with reference to FIG. 3, FIG. 4A, and FIG. 4B, even when the upper surface of each of the unit structures US has a sector shape with a truncated central portion, the refractive index of the lens structure 200 may be changed according to the refractive index function of a typical Luneburg lens described with reference to [Equation 1].

Figure 5C:
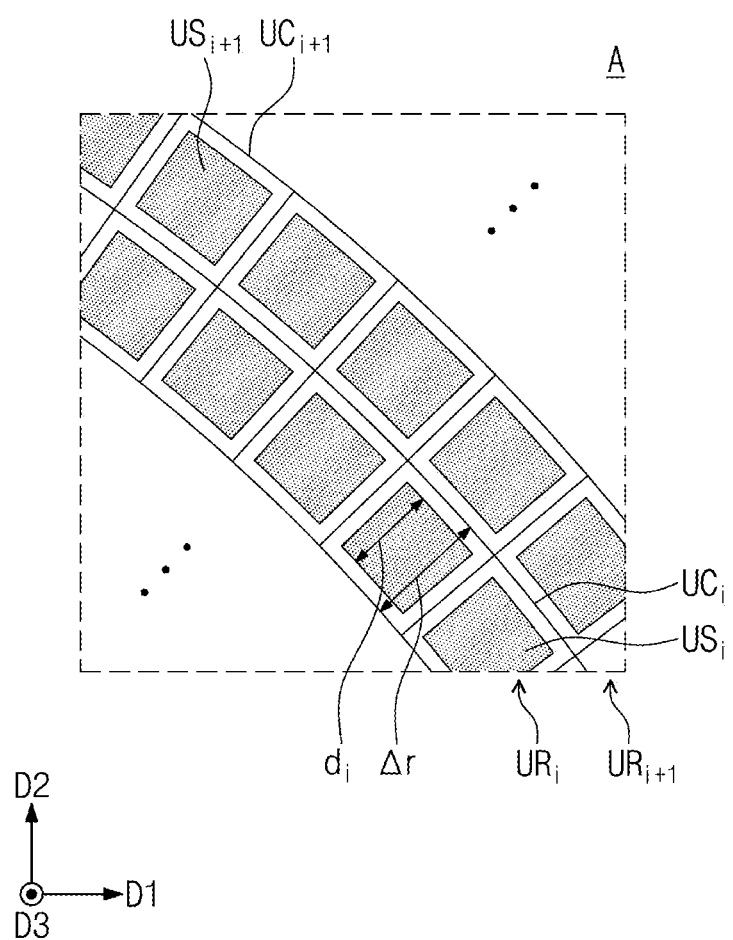
FIG. 5C is an enlarged view for describing a design method of an acoustic Luneburg meta lens according embodiments of the inventive concept, and corresponds to the portion A of FIG. 3.
Figure 5D:
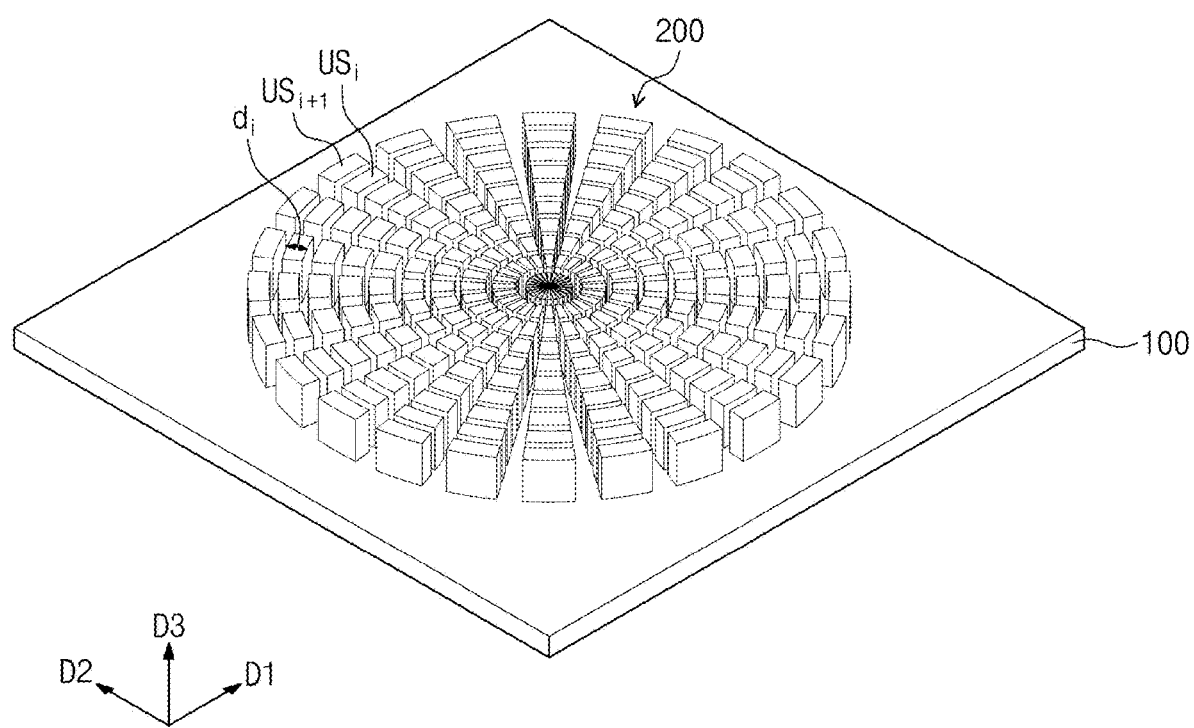
FIG. 5D is a perspective view for describing an acoustic Luneburg meta lens designed by the method described with reference to FIG. 5C.

FIG. 5C is an enlarged view for describing a design method of an acoustic Luneburg meta lens according to embodiments of the inventive concept, and corresponds to the portion A of FIG. 3. FIG. 5D is a perspective view for describing an acoustic Luneburg meta lens designed by the method described with reference to FIG. 5C. For convenience of description, descriptions of matters substantially the same as those described with reference to FIG. 3, FIG. 4A, FIG. 4B, FIG. 5A, and FIG. 5B will be omitted, and differences will be described in detail.

Referring to FIG. 5C and FIG. 5D, sidewalls of the i-th unit structures $US_i$ and the i+1 unit structures $US_{i+1}$ respectively adjacent thereto may be arranged in a radial direction. In addition, sidewalls of the i-th unit cells $UC_i$ and the i+1 unit cells $UC_{i+1}$ respectively adjacent thereto may be arranged in a radial direction. Each unit cell rows UR may include the same number of unit cells UC, and the same number of unit structures US may be disposed in each unit cell row UR.

The upper surface of each of the unit structures US may have, for example, a sector shape with a truncated central portion. The width of each of the unit structures US in a tangential direction may increase as the distance thereof from the center of the lens structure 200 increases in a radial direction. Angles (that is, the center angle of a fan) formed when opposite edges in each of the unit structures US are extended to meet each other may be the same.

FIG. 6A and FIG. 6B are conceptual views showing computational simulation results about the focus of a sound wave incident on an acoustic Luneburg meta lens according to embodiments of the inventive concept. FIG. 7A and FIG. 7B are conceptual views showing computational simulation results about the focusing of a sound wave incident on an acoustic Luneburg meta lens according to embodiments of the inventive concept.

More specifically, FIG. 6B shows a case in which the lens structure 200 is rotated in a counterclockwise direction by 30 degrees from being in the state illustrated in FIG. 6A. In addition, FIG. 7B shows a case in which a lens structure 201 is rotated in a counterclockwise direction by 30 degrees from being in the state illustrated in FIG. 7A. As described above, the acoustic Luneburg meta lens according to an embodiment of the inventive concept includes the lens structure 200 designed using a polar coordinate system, and the lens structure 201 designed using a rectangular coordinate system. In each of FIG. 6A, FIG. 6B, FIG. 7A, and FIG. 7B, a sound wave is incident in parallel with the X-axis from the left to the right, and the Y-axis direction bar of the enlarged portion represents the magnitude of sound pressure of the sound wave.

When FIG. 6A and FIG. 6B are compared with FIG. 7A and FIG. 7B, an acoustic Luneburg meta lens according to an embodiment of the inventive concept exhibits the same output properties even when the lens structure 200 is rotated (see FIG. 6A and FIG. 6B in comparison), but in the case of an acoustic Luneburg meta lens according to a comparative embodiment, when the lens structure 201 is rotated, a sound wave is not focused on the opposite side of an incident direction (that is, the position of a focal point is changed), and the travel direction of the sound wave is bent (see FIG. 7A and FIG. 7B in comparison).

Accordingly, the lens structure 201 designed using a rectangular coordinate system is subjected to different refractive index changes depending on the angle at which a wave is incident, but the lens structure 200 designed using a polar coordinate system according to an embodiment of the inventive concept is subjected to the same refractive index change regardless of the angle at which a wave is incident.

Figure 8A:
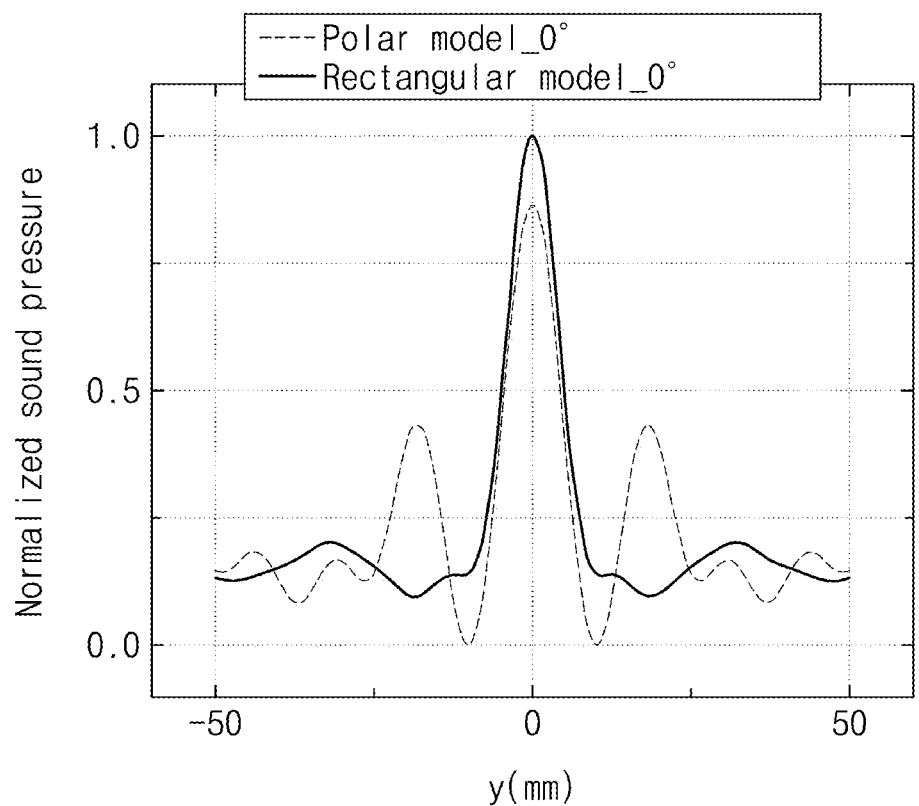
FIG. 8A and FIG. 8B are graphs for comparing and describing properties of an acoustic Luneburg meta lens according to embodiments of the inventive concept and properties of an acoustic Luneburg meta lens according to comparative embodiments.
Figure 8B:
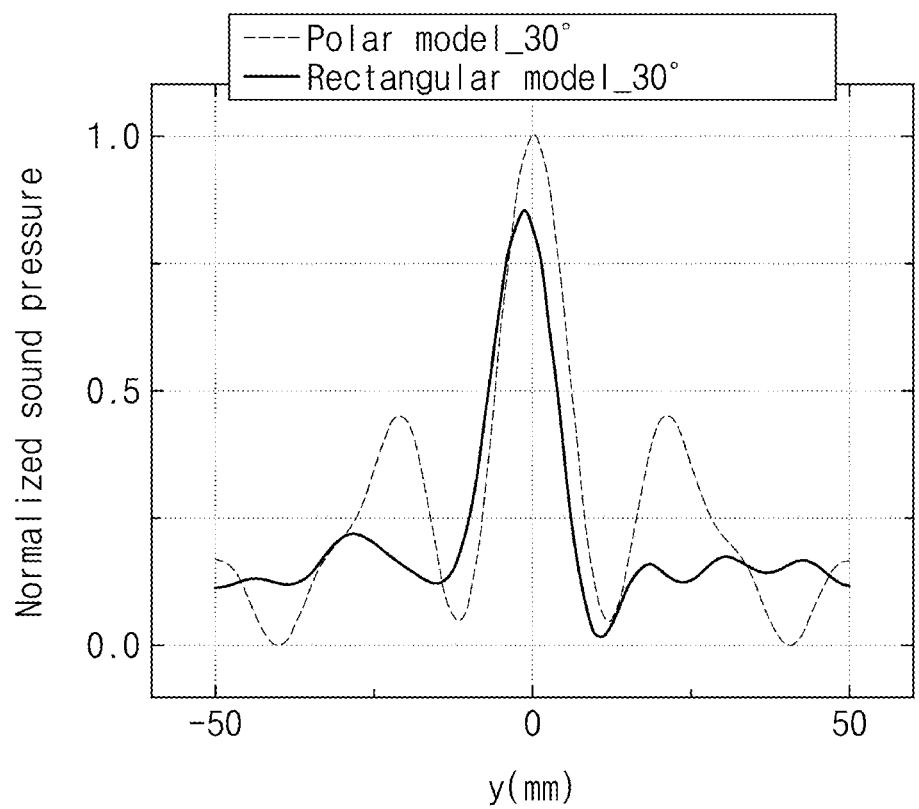

FIG. 8A and FIG. 8B are graphs for comparing and describing focusing properties of an acoustic Luneburg meta lens according to embodiments of the inventive concept and properties of an acoustic Luneburg meta lens according to comparative embodiments.

More specifically, FIG. 8A is a graph showing the magnitude of normalized sound pressure with respect to a y-axis position of a sound pressure focus point on a back surface of an acoustic Luneburg meta lens in the case of FIG. 6A (polar model_0°) and the magnitude of normalized sound pressure with respect to a y-axis position of a sound pressure focus point on a back surface of an acoustic Luneburg meta lens in the case of and FIG. 7A (rectangular model_0°). FIG. 8A is a graph showing the magnitude of normalized sound pressure with respect to a y-axis position of a sound pressure focus point on a back surface of an acoustic Luneburg meta lens in the case of FIG. 6B (polar model_30°) and the magnitude of normalized sound pressure with respect to a y-axis position of a sound pressure focus point on a back surface of an acoustic Luneburg meta lens in the case of and FIG. 7B (rectangular model_30°).

Referring to FIG. 8A, when the incident angle of a sound wave is 0°, sound pressure graphs of the acoustic Luneburg meta lens according to an embodiment of the inventive concept (hereinafter, the example of the inventive concept) and the acoustic Luneburg meta lens according to a comparative embodiment of the inventive concept (hereinafter, the comparative example) exhibit similar trends. At a point where y=0 (mm), the sound pressure of the comparative example is greater than the sound pressure of the example of the inventive concept.

Referring to FIG. 8B, when the incident angle of a sound wave is 30°, the sound pressure graph of the comparative example moves to the left with respect to the sound pressure graph of the example of the inventive concept. In the example of the inventive concept, similar to the case in which the incident angle of a sound wave is 0°, sound pressure is focused at a point where y=0 (mm), whereas sound pressure is focused at a point where y=3 (mm) in the comparative example.

Figure 9:
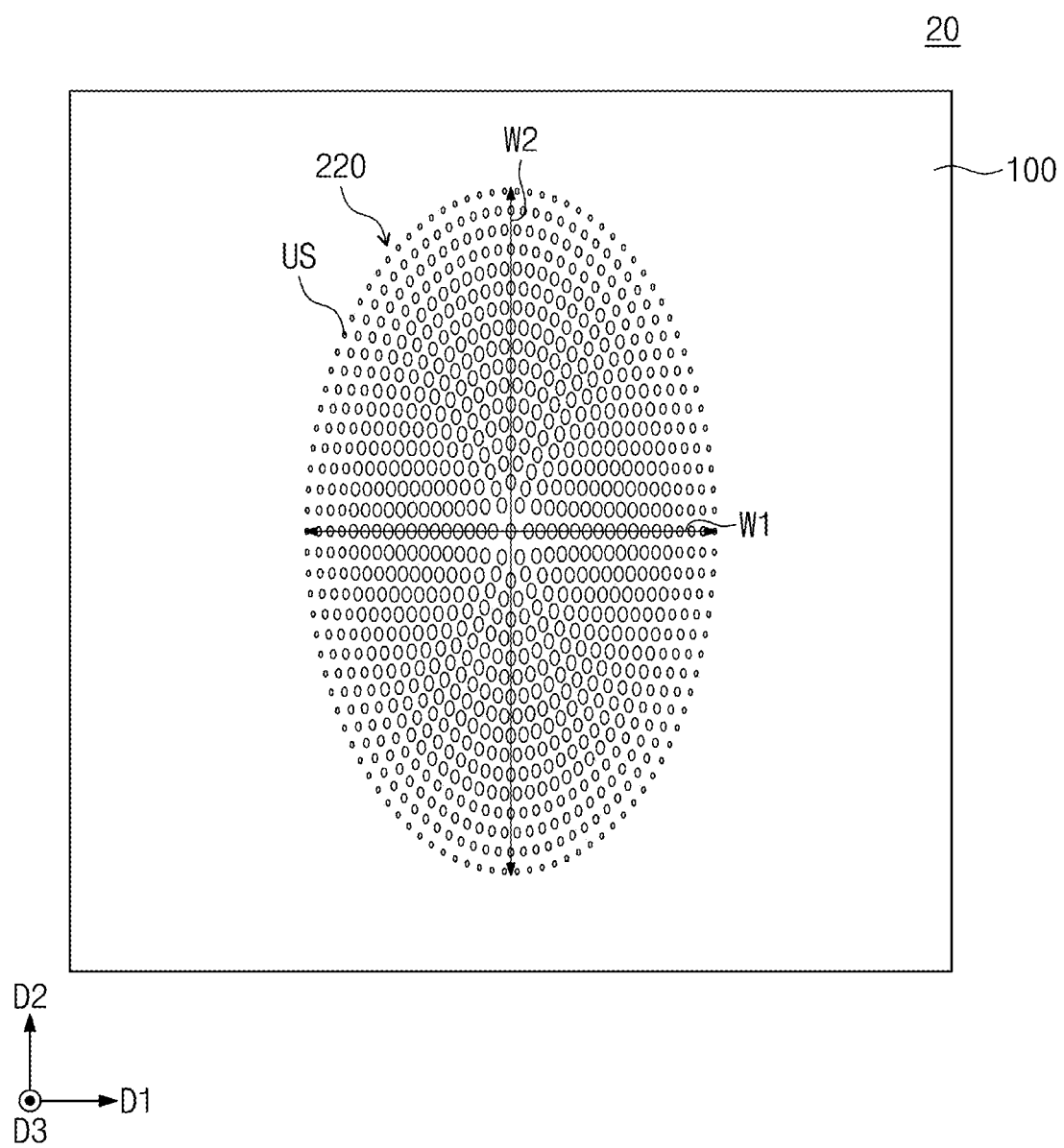
FIG. 9 is a plan view for describing an acoustic Luneburg meta lens according to embodiments of the inventive concept.
Figure 10:
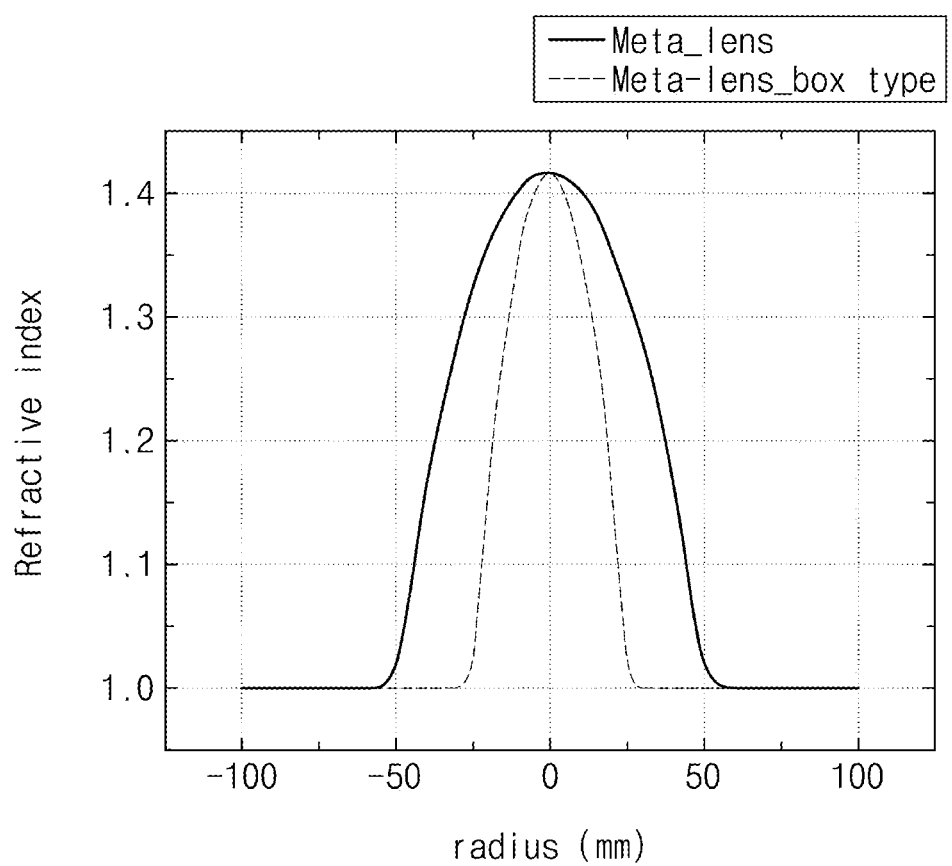
FIG. 10 is a graph for describing a change in the refractive index of each of acoustic Luneburg meta lenses according to embodiments of the inventive concept.

FIG. 9 is a plan view for describing an acoustic Luneburg meta lens according to embodiments of the inventive concept. FIG. 10 is a graph for describing a change in the refractive index of each of acoustic Luneburg meta lenses according to embodiments of the inventive concept. For convenience of description, descriptions of matters substantially the same as those described with reference to FIG. 1 will be omitted, and differences will be described in detail.

Referring to FIG. 9, a lens structure 220 of a box-type Luneburg meta lens 20 may have an elliptical shape. A diameter (or the maximum width) W1 of the lens structure 220 in the first direction D1 may be smaller than a diameter (or the maximum width) W2 of the lens structure 220 in the second direction D2. For example, the diameter (or the maximum width) W1 of the lens structure 220 in the first direction D1 may be ½ times or 1/n times (n is a natural number) than the diameter (or the maximum width) W2 of the lens structure 220 in the second direction D2. The box-type Luneburg meta lens 20 of FIG. 9 may have a smaller volume than the Luneburg meta lens 10 described with reference to FIG. 1.

The box-type Luneburg meta lens 20 of FIG. 9 may have a greater difference between impedance of the unit structures US and impedance of a background material than the Luneburg meta lens 10 of FIG. 1. For example, when the box-type Luneburg meta lens 20 of FIG. 9 is used underwater, the unit structures US of the box-type Luneburg meta lens 20 may include a material having a greater impedance than a background material. For example, the unit structures US of the box-type Luneburg meta lens 20 may include plastic, stainless steel, tungsten, or the like having a greater impedance than a background material, but this is only exemplary. The inventive concept is not limited thereto.

Referring to FIG. 10, the box-type Luneburg meta lens 20 (meta-lens_box type) of FIG. 9 is formed by halving the diameter W1 of the Luneburg meta lens 10 of FIG. 1 in the first direction D1. The box-type Luneburg meta lens 20 of FIG. 9 may have a refractive index gradient which changes more steeply than that of the Luneburg meta lens 10 of FIG. 1. Accordingly, the box-type Luneburg meta lens 20 of FIG. 9 may change the speed of an incident sound wave more steeply than the Luneburg meta lens 10 of FIG. 1.

Figure 11:
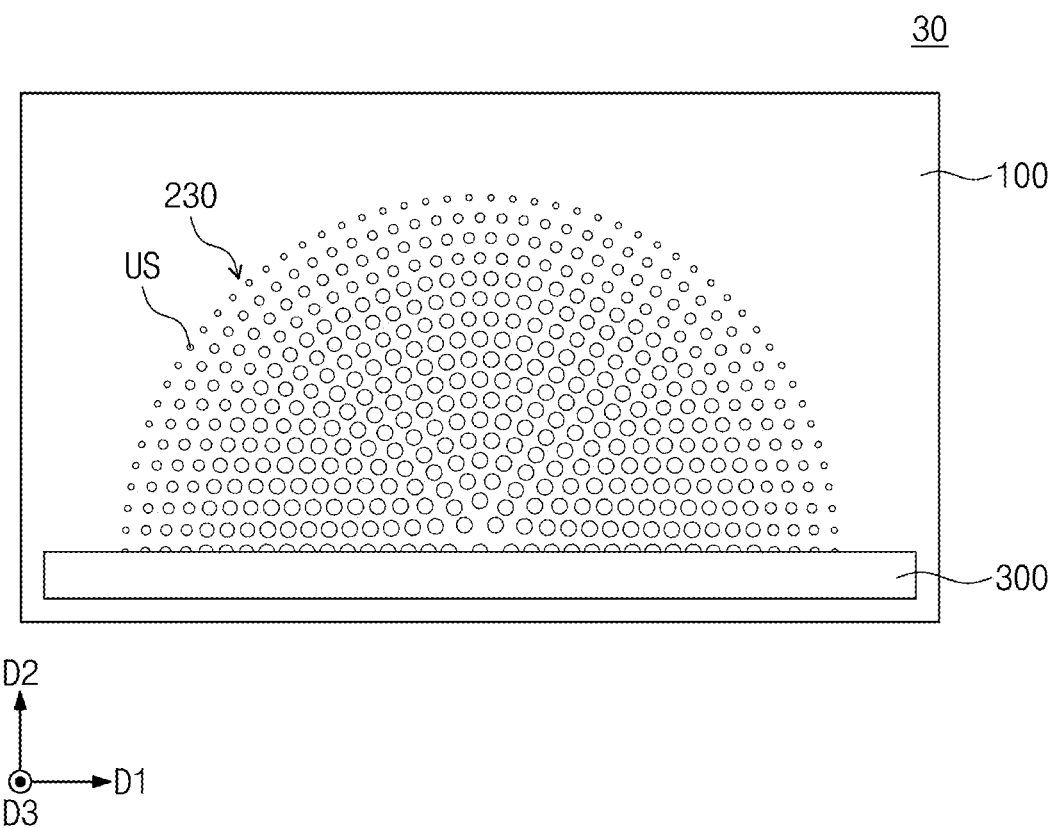
FIG. 11 is a plan view for describing an acoustic Luneburg meta lens according to embodiments of the inventive concept.
Figure 12:
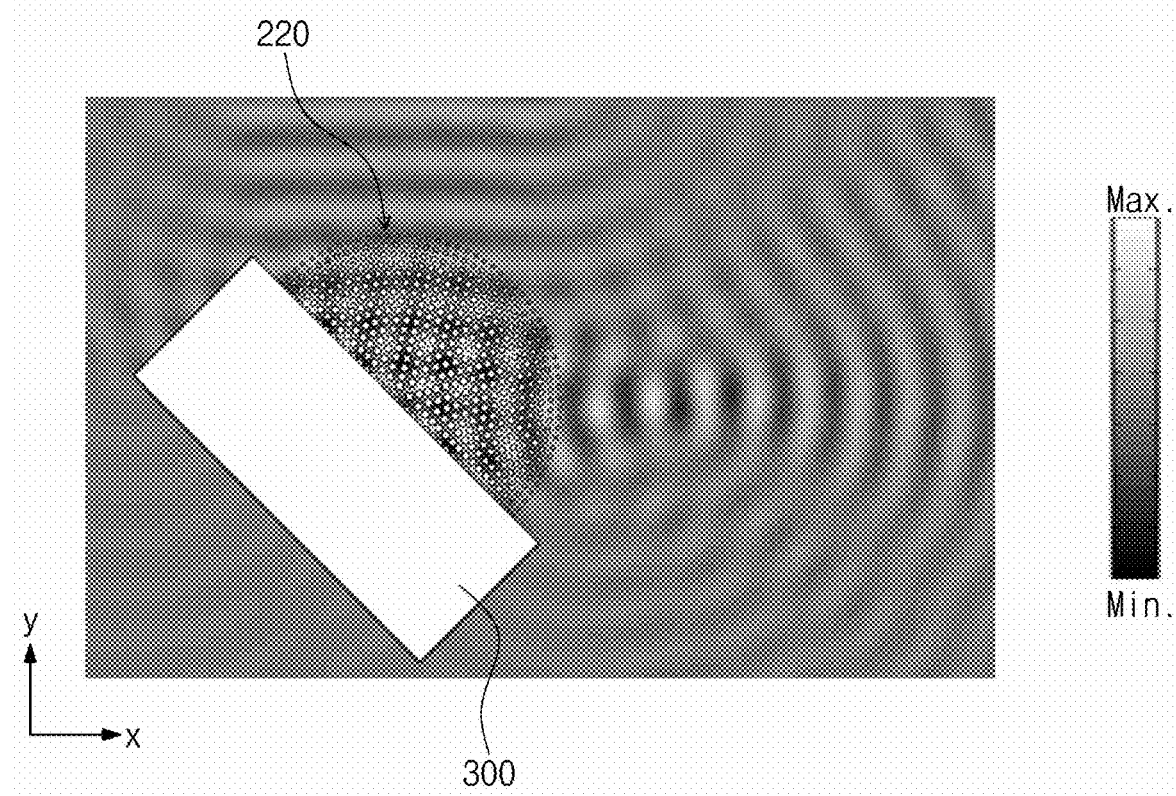
FIG. 12 is a conceptual view showing computational simulation results of a sound wave incident on an acoustic Luneburg meta lens according embodiments of the inventive concept.

FIG. 11 is a plan view for describing an acoustic Luneburg meta lens according to embodiments of the inventive concept. FIG. 12 is a conceptual view showing computational simulation results about the focusing of a sound wave incident on an acoustic Luneburg meta lens according embodiments of the inventive concept. For convenience of description, descriptions of matters substantially the same as those described with reference to FIG. 1 will be omitted, and differences will be described in detail.

Referring to FIG. 11, a reflection plate-coupled Luneburg meta lens 30 may include a lens structure 230 and a reflection plate 300 provided on a substrate 100. The lens structure 230 of the reflection plate-coupled Luneburg meta lens 30 may have a semi-circular shape. One surface of the lens structure 230 may be in contact with the reflection plate 300. The reflection plate-coupled Luneburg meta lens 30 of FIG. 11 may have a smaller volume than the Luneburg meta lens 10 described with reference to FIG. 1.

Referring to FIG. 12, a sound wave incident at 90 degrees with respect to the x-axis (that is, parallel to the y-axis) may be reflected by the reflection plate 300 of the reflection plate-coupled Luneburg meta lens 30 and output parallel to the x-axis (that is, at 90 degrees with respect to the y-axis). In FIG. 12, the y-axis direction bar represents the magnitude of sound pressure of a sound wave.

Figure 13:
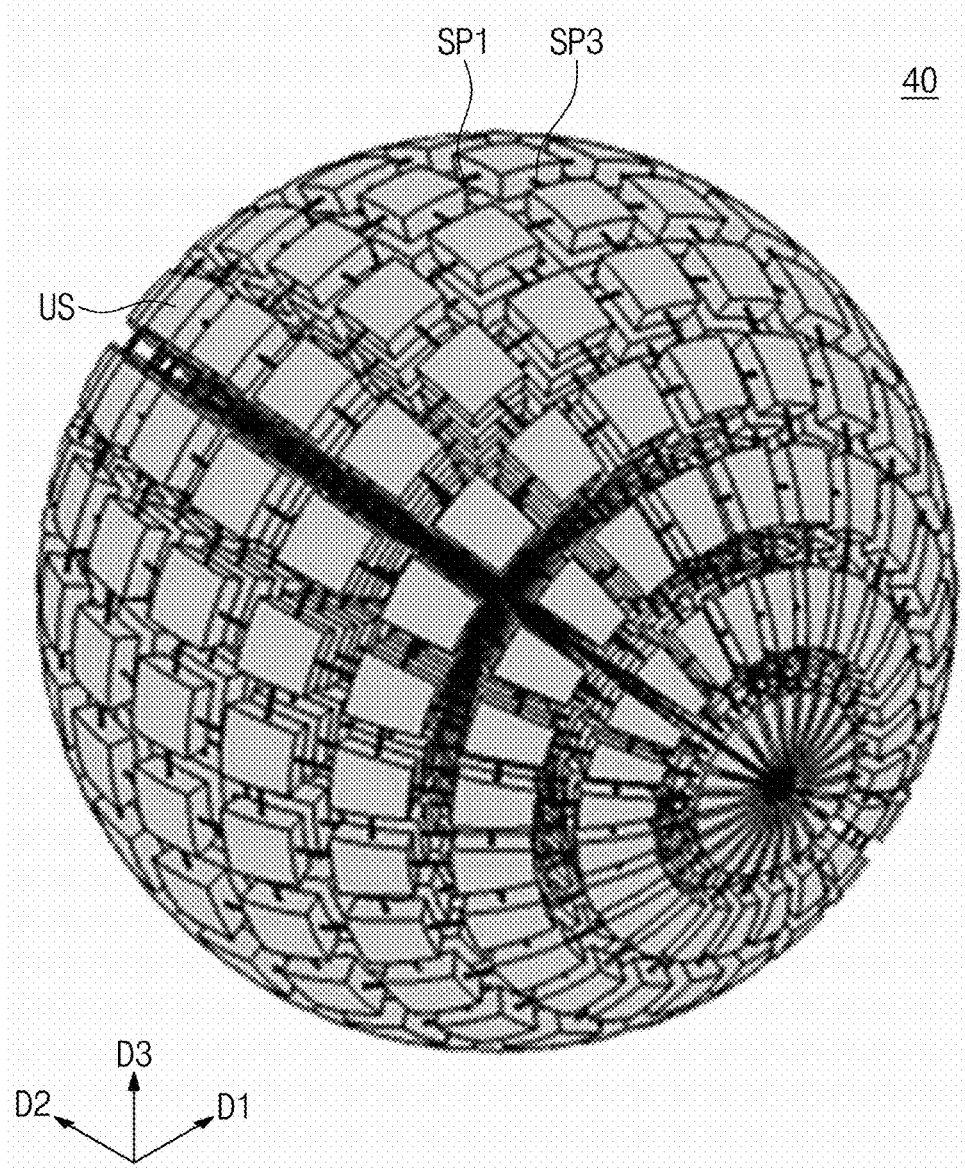
FIG. 13 is a perspective view for describing an acoustic Luneburg meta lens according to embodiments of the inventive concept.

FIG. 13 is a perspective view for describing an acoustic Luneburg meta lens according to embodiments of the inventive concept. For convenience of description, descriptions of matters substantially the same as those described with reference to FIG. 1 will be omitted, and differences will be described in detail.

Referring to FIG. 13, a three-dimensional Luneburg meta lens 40 may include a plurality of unit structures US arranged in a spherical shape. A cross-section of each of the unit structures US may have a sector shape with a truncated central portion. The unit structures US may be connected to each other by first to third supporting parts SP1, SP2, and SP3 (refer to FIG. 14D for the second supporting parts SP2). The unit structures US may be arranged to have rotational symmetry with respect to the center of the three-dimensional Luneburg meta lens 40. In addition, the unit structures US may be arranged to be linearly symmetric with respect to any straight axis passing through the center of the three-dimensional Luneburg meta lens 40. That is, the three-dimensional Luneburg meta lens 40 may have symmetry with respect to all directions.

FIG. 14A to FIG. 14E are conceptual views for describing a design method of an acoustic Luneburg meta lens according to embodiments of the inventive concept.

Figure 14A:
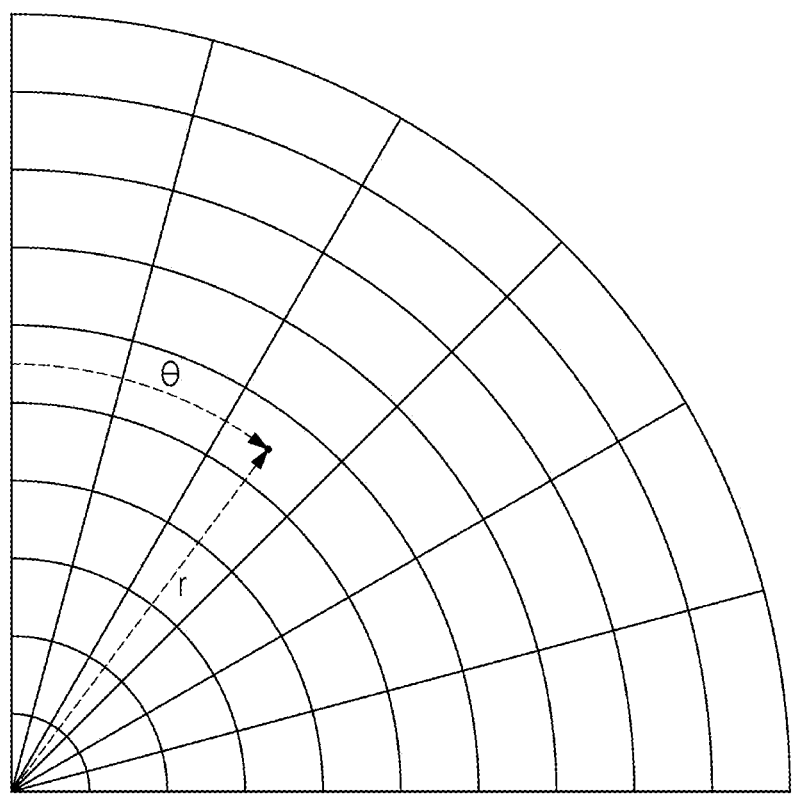
FIG. 14A to FIG. 14E are conceptual views for describing a design method of an acoustic Luneburg meta lens according to embodiments of the inventive concept.

Referring to FIG. 14A, a quadrant (¼ circle) may be divided into a plurality of cells using a polar coordinate system. Each of the cells may be arranged in a radial direction and a tangential direction. Positions of the cells may be determined by the radial direction component r and the tangential direction component θ.

Figure 14B:
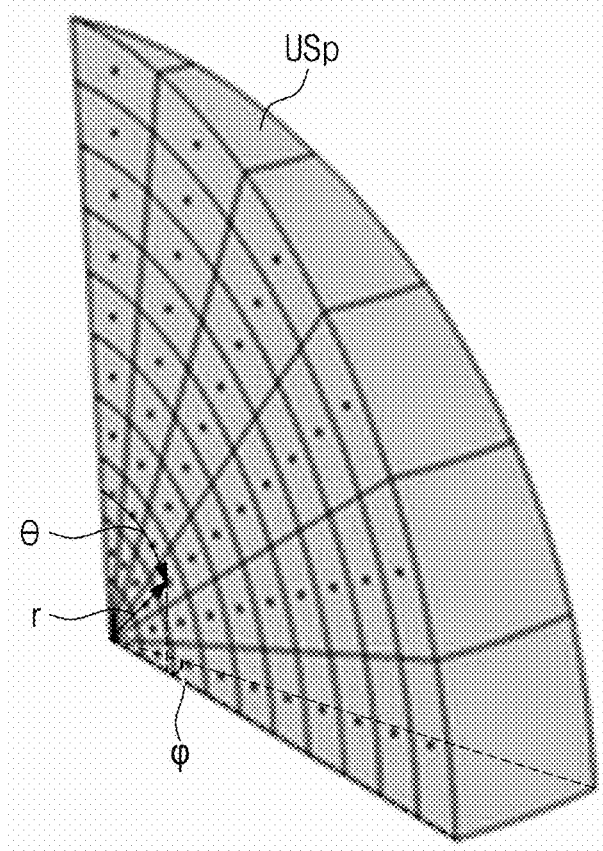

Referring to FIG. 14A and FIG. 14B, the cells may be rotated in an azimuthal direction using a spherical coordinate system. The plurality of cells are rotated to have a volume, and a plurality of preliminary unit structures USp may be formed. Positions of the preliminary unit structures USp may be determined by the radial direction component r, the tangential direction component θ, and a azimuthal direction component φ of the spherical coordinate system.

Figure 14C:
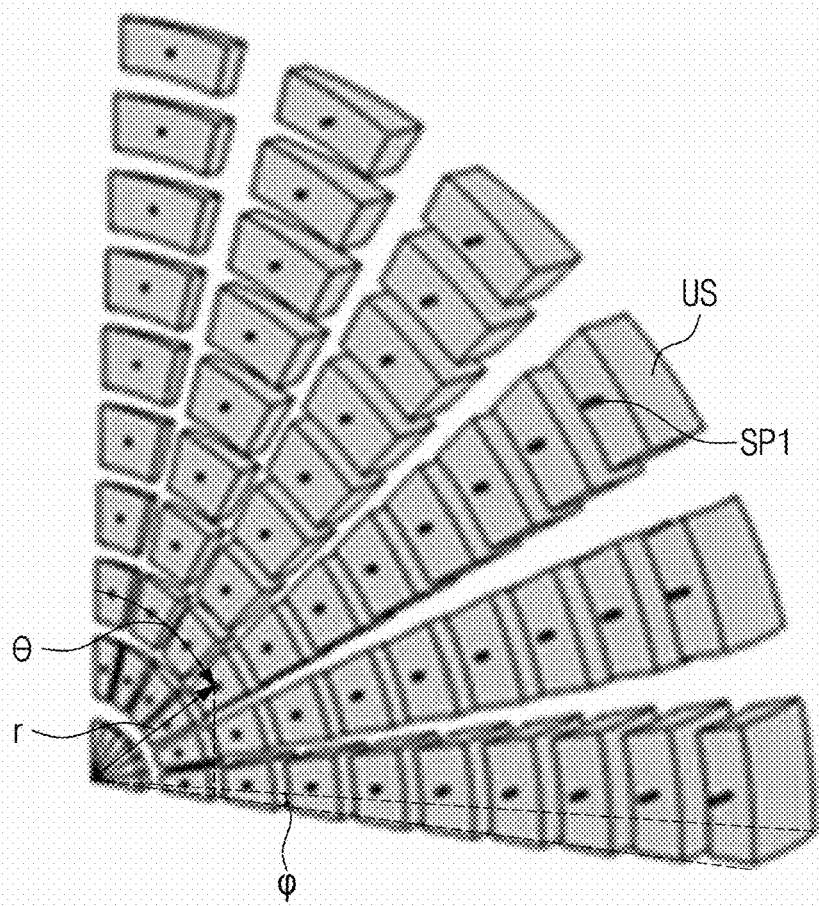

Referring to FIG. 14B and FIG. 14C, a plurality of unit structures US may be formed through reducing the volume of the preliminary unit structures USp by a method similar to that described with reference to [Equation 7] above. The unit structures US may be spaced apart from each other in a radial direction and a tangential direction.

Figure 14D:
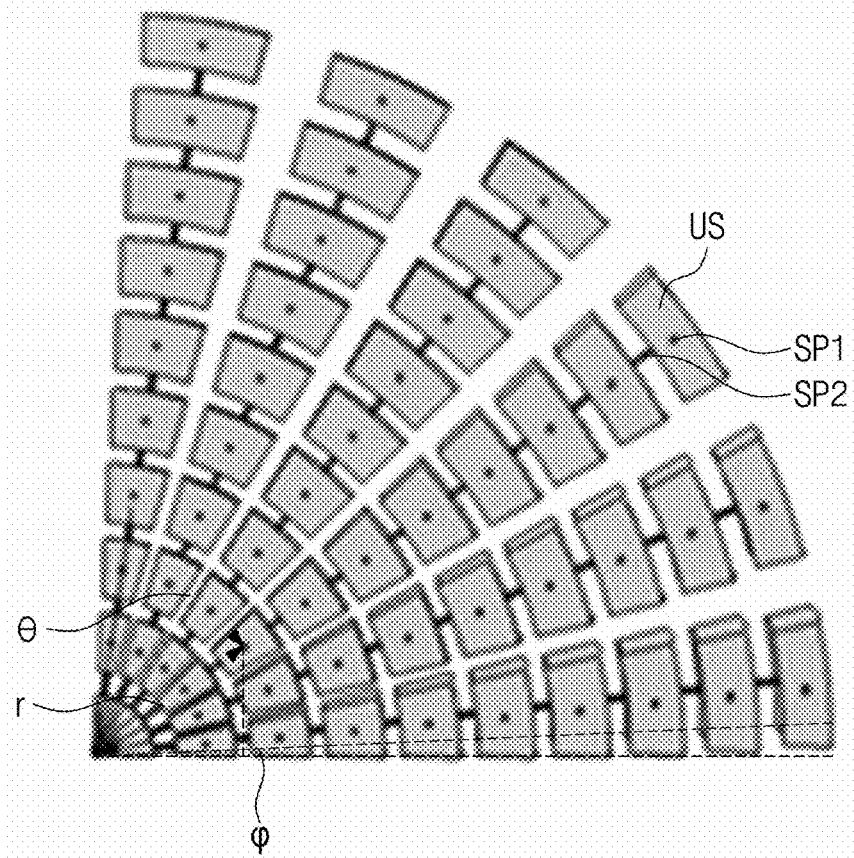

Referring to FIG. 14C and FIG. 14D, the first supporting parts SP1 connecting the unit structures US to each other which are spaced apart in the azimuthal direction and the second supporting parts SP2 connecting the unit structures US to each other which are spaced apart in the radial direction may be formed.

Figure 14E:
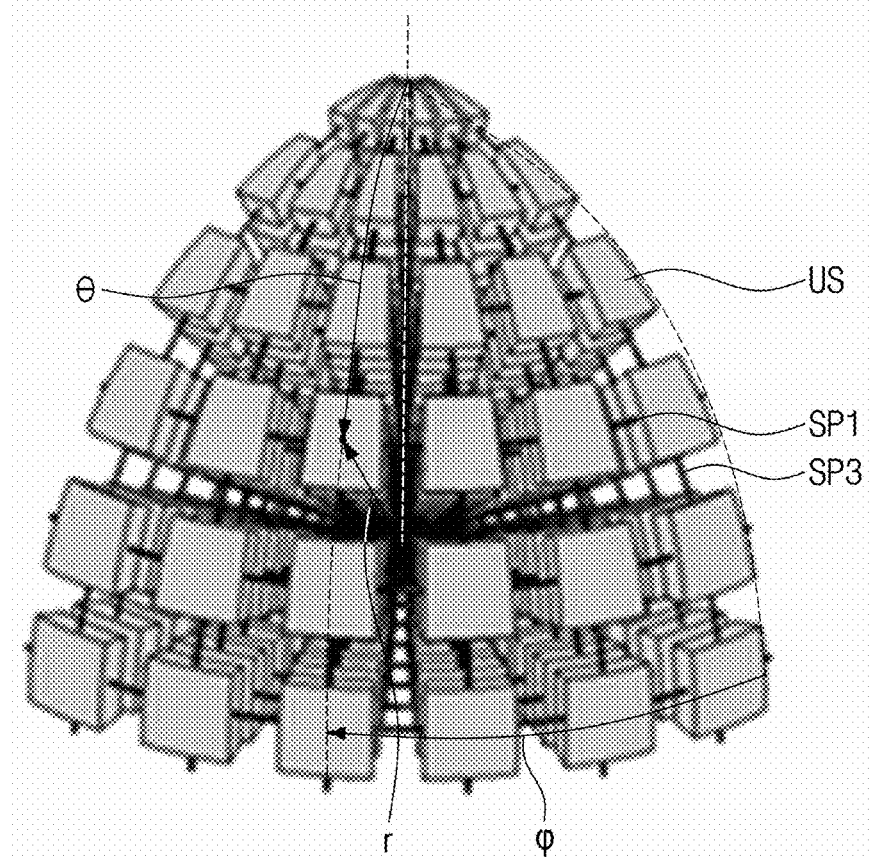

Referring to FIG. 14D and FIG. 14E, the structure of FIG. 14D may be rotated in the azimuthal direction to form an ⅛ spherical shape. In addition, the third supporting parts SP3 connecting the unit structures US to each other which are spaced apart in the tangential direction may be formed.

Referring to FIG. 14E and FIG. 13, the ⅛ spherical shape of FIG. 14E may be rotated in the tangential direction and the azimuthal direction to form the three-dimensional Luneburg meta lens 40. Unlike the three-dimensional Luneburg meta lens 40 of FIG. 13, a Luneburg meta lens may be implemented as the structure of FIG. 14E itself (⅛ spherical shape), or by rotating the structure of FIG. 14E only in one direction of the tangential direction and the azimuthal direction (¼ spherical shape or ½ spherical shape).

Figure 15A:
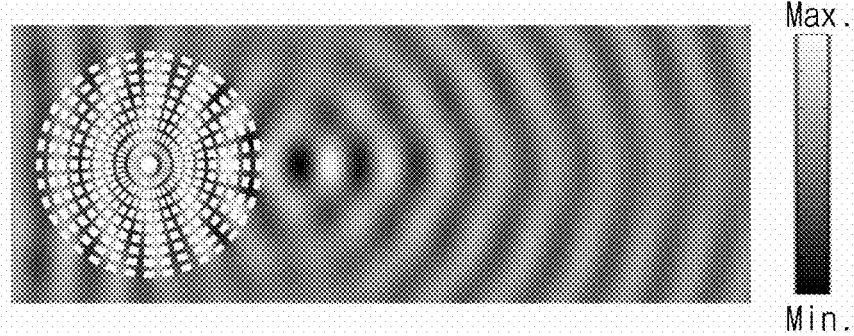
FIG. 15A to FIG. 15C are conceptual views showing computational simulation results of a sound wave incident on an acoustic Luneburg meta lens according to embodiments of the inventive concept.
Figure 15B:
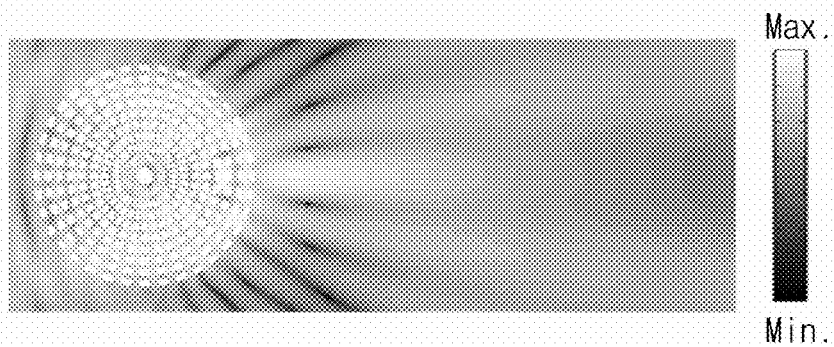
Figure 15C:
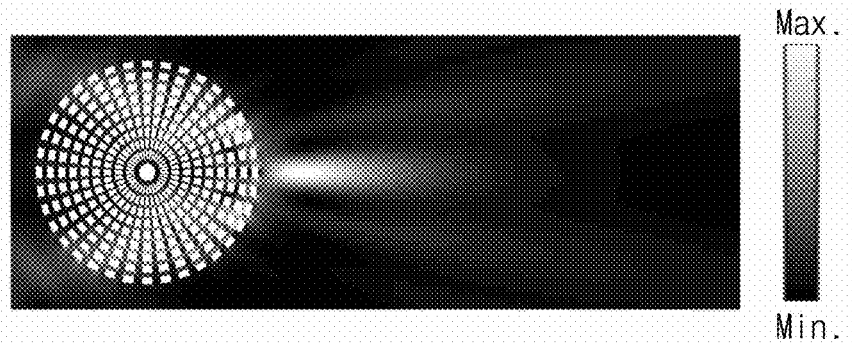

FIG. 15A and FIG. 15C are conceptual views showing computational simulation results about the focus of a sound wave incident on an acoustic Luneburg meta lens according to embodiments of the inventive concept.

More specifically, FIG. 15A shows the magnitude of an acoustic pressure field in a Pa unit, FIG. 15B shows the level of a sound pressure field in dB, and FIG. 15C shows the sound intensity field of a sound wave in a W/m² unit. FIG. 15A to FIG. 15C were measured when the frequency of a sound wave was 1 kHz to 20 kHz.

Referring to FIG. 15A to FIG. 15C, a sound wave incident on the three-dimensional Luneburg meta lens 40 may be focused without aberration at one point of an opposite edge of an incident point.

Figure 16:
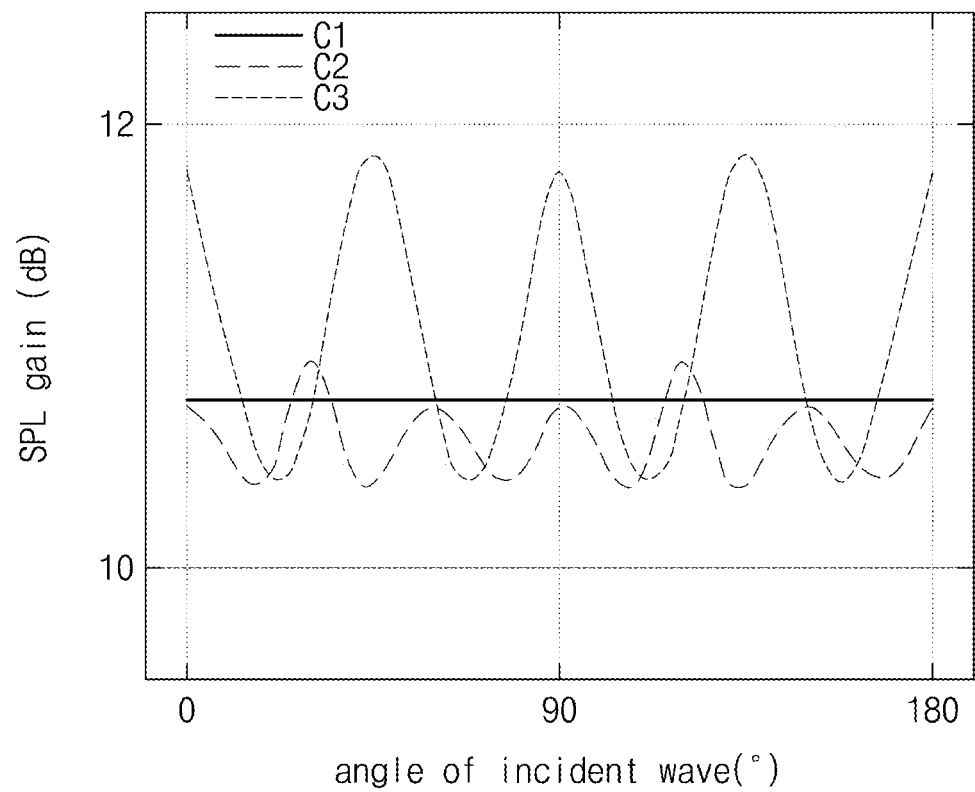
FIG. 16 is a graph for comparing and describing properties of an acoustic Luneburg meta lens according to embodiments of the inventive concept and properties of an acoustic Luneburg meta lens according to comparative embodiments.

FIG. 16 is a graph for comparing and describing properties of acoustic Luneburg meta lenses according to embodiments of the inventive concept and properties of acoustic Luneburg meta lenses according to comparative embodiments. Specifically, FIG. 16 is a graph showing a sound pressure level gain according to an incident angle of the acoustic Luneburg meta lenses according to examples of the inventive concept and the acoustic Luneburg meta lenses according to comparative examples.

Referring to FIG. 16, in the case of acoustic Luneburg meta lenses C2 and C2 according to examples of the inventive concept, a variation width of the sound pressure level gain according to a change in the incident angle of the sound wave is relatively small, whereas in the case of an acoustic Luneburg meta lens C3 according to comparative examples, a variation width of the sound pressure level gain according to a change in the incident angle of the sound wave is relatively large. Specifically, when an upper surface of each of unit structures has a sector shape with a truncated central portion C1, a constant sound pressure level gain is shown regardless of an incident angle in the range of 0° to 180°. When an upper surface of each of unit structures has a circular shape C2, although a sound pressure level gain according to an incident angle is changed, the variation width thereof may be smaller than that of the acoustic Luneburg meta lens C3 according to comparative examples.

An acoustic Luneburg meta lens according to the present invention may be effectively designed in a short period of time using symmetry, and may exhibit uniform output properties regardless of the incident angle of an incident wave.

Although the embodiments of the present invention have been described with reference to the accompanying drawings, it will be understood by those who have ordinary skills in the art to which the present invention pertains that the present invention may be embodied in other specific forms without changing the technical spirit or essential features thereof. It is therefore to be understood that the above-described embodiments are illustrative in all aspects and not restrictive.

What is claimed is:

1. An acoustic Luneburg meta lens comprising:
a lens structure;
a substrate under the lens structure; and
a reflection plate on the substrate, wherein:
the lens structure includes a plurality of unit structures;
a volume of the unit structures decreases from a center of the lens structure toward an edge thereof;
positions of the unit structures are determined by a radial direction component and a tangential direction component of a polar coordinate system;
the lens structure has a semi-circular shape; and
one surface of the lens structure is in contact with the reflection plate.

2. The acoustic Luneburg meta lens of claim 1, further comprising connecting rods connecting the unit structures to each other.

3. The acoustic Luneburg meta lens of claim 1, wherein a refractive index of the lens structure varies according to a following [Equation 1]:

$$n=\sqrt{2-(r/R)^2}$$ [Equation 1]

wherein, n represents a refractive index, r represents a distance from the center of the lens structure, and R represents a radius of the lens structure.

4. The acoustic Luneburg meta lens of claim 1, wherein an upper surface of each of the unit structures has a circular or polygonal shape.

5. The acoustic Luneburg meta lens of claim 4, wherein areas of the upper surfaces of the unit structures decrease as a distance from the center of the lens structure increases.

6. The acoustic Luneburg meta lens of claim 1, wherein an upper surface of each of the unit structures has a sector shape with a truncated central portion.

7. The acoustic Luneburg meta lens of claim 1, wherein a diameter of the lens structure in a first direction is less than a diameter thereof in a second direction orthogonal to the first direction.

8. The acoustic Luneburg meta lens of claim 7, wherein the diameter of the lens structure in the first direction is 1/n times, n is a natural number, the diameter thereof in the second direction.

9. The acoustic Luneburg meta lens of claim 7, wherein the unit structures comprise a material having a greater impedance than a background material.

10. The acoustic Luneburg meta lens of claim 1, wherein:
an upper limit of an operation frequency domain is inversely proportional to a pitch at which the unit structures are arranged in a radial direction; and
a lower limit of the operation frequency domain is inversely proportional to a diameter of the lens structure.

11. The acoustic Luneburg meta lens of claim 1, wherein a thickness of the lens structure is smaller than a wavelength of an operation wave.

12. A method for designing an acoustic Luneburg meta lens, the method comprising:
designing unit cells; and
respectively disposing a unit structure in each of the unit cells, wherein:
a volume of the unit structures decreases from a center toward an edge; and
positions of the unit cells and the unit structures are determined by direction components of a polar coordinate system or a spherical coordinate system;
wherein the designing of unit cells comprises:
designing a plurality of unit cell rows; and
dividing each of the unit cell rows into unit cells of a same volume,
wherein each of the unit cell rows has a concentric ring shape, and
an upper surface of each of the unit cells has a sector shape with a truncated central portion; and
wherein:
radii of the unit cell rows increase at regular intervals as a distance from the center increases; and
a radius of each of the unit structures is less than or equal to the interval of the unit cell rows.

13. The method of claim 12, wherein:
an upper surface of each of the unit structures has a shape in which an upper surface of each of the unit cells is reduced to a predetermined ratio; and
the upper surface of each of the unit structures is similar to the upper surface of each of the unit cells.

14. The method of claim 12, wherein an upper surface of each of the unit structures has a shape of a circle, ellipse, polygon, or cross.

* * * * *